US011638875B2

(12) United States Patent
Nakada et al.

(10) Patent No.: US 11,638,875 B2
(45) Date of Patent: May 2, 2023

(54) COMPUTER-READABLE NON-TRANSITORY STORAGE MEDIUM HAVING GAME PROGRAM STORED THEREIN, PROCESSING APPARATUS, PROCESSING SYSTEM, AND GAME PROCESS CONTROL METHOD

(71) Applicant: NINTENDO CO., LTD., Kyoto (JP)

(72) Inventors: Ryuichi Nakada, Kyoto (JP); Kuniaki Ito, Kyoto (JP)

(73) Assignee: Nintendo Co., Ltd., Kyota (JP)

( * ) Notice: Subject to any disclaimer, the term of this patent is extended or adjusted under 35 U.S.C. 154(b) by 194 days.

(21) Appl. No.: 17/233,002

(22) Filed: Apr. 16, 2021

(65) Prior Publication Data
US 2021/0228987 A1    Jul. 29, 2021

Related U.S. Application Data

(63) Continuation of application No. 16/574,481, filed on Sep. 18, 2019, now Pat. No. 11,007,438.

(30) Foreign Application Priority Data

Feb. 7, 2019    (JP) .............................. JP2019-020978

(51) Int. Cl.
*A63F 13/53*    (2014.01)
*A63F 13/57*    (2014.01)
(Continued)

(52) U.S. Cl.
CPC .......... *A63F 13/57* (2014.09); *A63F 13/5372* (2014.09); *A63F 13/50* (2014.09); *A63F 13/53* (2014.09)

(58) Field of Classification Search
CPC ....... A63F 13/50; A63F 13/53; A63F 13/5372
See application file for complete search history.

(56) References Cited

U.S. PATENT DOCUMENTS

| 4,176,468 | A | * | 12/1979 | Marty, Jr. | .............. G09B 9/003 |
| | | | | | 434/14 |
| 4,959,015 | A | * | 9/1990 | Rasinski | ................ G09B 9/085 |
| | | | | | 434/2 |
| 8,690,656 | B2 | | 4/2014 | Yamada | |
| 9,878,244 | B2 | | 1/2018 | Yamagami | |

(Continued)

FOREIGN PATENT DOCUMENTS

| JP | 2001-321569 | 11/2001 |
| JP | 2003-062353 | 3/2003 |

(Continued)

OTHER PUBLICATIONS

Japanese Office Action dated Jan. 10, 2023 for the corresponding Japanese Patent Application No. 2020-004621 (with translation), 7 pages.

(Continued)

*Primary Examiner* — Corbett B Coburn
(74) *Attorney, Agent, or Firm* — Nixon & Vanderhye PC

(57) ABSTRACT

A first game process that proceeds independently of a second game process related to opponents for a user is performed. State data indicating a second game state of the second game process related to each of a plurality of the opponents is sequentially acquired, and a display image including a first image reflecting a first game state of the first game process and a plurality of second images reflecting the second game states indicated by the state data is sequentially generated. At least one policy is selected on the basis of an operation by the user, a target is specified from among the plurality of the opponents on the basis of the selected policy, and an instruction that changes a game state of the target is made if a game state of the user satisfies a predetermined condition.

21 Claims, 24 Drawing Sheets

(51) Int. Cl.
*A63F 13/5372* (2014.01)
*A63F 13/50* (2014.01)

(56) References Cited

U.S. PATENT DOCUMENTS

| | | |
|---|---|---|
| 2002/0022521 A1 | 2/2002 | Idaka |
| 2005/0192097 A1 | 9/2005 | Farnham et al. |
| 2007/0026944 A1 | 2/2007 | Maehiro et al. |
| 2007/0060347 A1 | 3/2007 | Itou |
| 2008/0318654 A1 | 12/2008 | Langridge |
| 2014/0243079 A1 | 8/2014 | Tsukioka |
| 2015/0038226 A1 | 2/2015 | Maeda |
| 2016/0074754 A1 | 3/2016 | Kuninobu |
| 2020/0122039 A1 | 4/2020 | Meuleau |
| 2020/0254345 A1 | 8/2020 | Nakada |

FOREIGN PATENT DOCUMENTS

| | | |
|---|---|---|
| JP | 2005-270649 | 10/2005 |
| JP | 2006-122215 | 5/2006 |
| JP | 2007-029571 | 2/2007 |
| JP | 2011-055981 | 3/2011 |
| JP | 2012-045177 | 3/2012 |
| JP | 2012-223371 | 11/2012 |
| JP | 2019-020978 | 2/2019 |

OTHER PUBLICATIONS

Japanese Office Action dated Jan. 10, 2023 for the corresponding Japanese Patent Application No. 2020-004622 (with translation), 11 pages.
Kazuhisa Kawata, et al., "Proposal of clustering technique in P2P network", Information Processing Society of Japan Research Report Information Processing Research Institute vol. 2007 No. 38 2007-DSM-45 Distributed System/Internet Operation Technology, Information Processing Society of Japan, May 10, 2007, vol. 2007, No. 38, pp. 49-54, ISSN:0919-6072, 10 pages.
"Tetris 64", "Dengeki Nintendo 64 January issue", Media Works, Jan. 1, 1999, vol. 4, No. 1, p. 88, 4 pages.

\* cited by examiner

| WAIT NUMBER | OPPONENT ID | ATTACK POWER | ELAPSED TIME |
|---|---|---|---|
| 001 | xxxx | ... | ... |
| 002 | xxx | ... | ... |
| 003 | xxx | ... | ... |
| ⋮ | ⋮ | ⋮ | ⋮ |

| 341 | 342 | 343 | 344 | 345 | 346 | 347 |
|---|---|---|---|---|---|---|
| USER ID | PLAY FIELD INFORMATION | ATTACK-RELATED INFORMATION | TARGET INFORMATION | GAME-OVER INFORMATION | WATCHING INFORMATION | BADGE INFORMATION |
| 00001 | ... | ... | ... | No | | 0 |
| 00002 | ... | ... | ... | No | | 1 |
| 00003 | ... | ... | ... | Yes | DURING WATCHING | 0 |
| ... | ... | ... | ... | ... | ... | ... |

| 360 | 361 | 362 | 363 | 364 | 365 | 366 | 367 |
|---|---|---|---|---|---|---|---|
| IMAGE FRAME NUMBER | USER ID | PLAY FIELD INFORMATION | ATTACK-RELATED INFORMATION | TARGET INFORMATION | GAME-OVER INFORMATION | WATCHING INFORMATION | BADGE INFORMATION |
| 00001 | 00001 | ... | ... | ... | No | | 0 |
| 00002 | 00002 | ... | ... | ... | No | | 1 |
| 00003 | 00003 | ... | ... | ... | Yes | DURING WATCHING | 0 |
| ... | ... | ... | ... | ... | ... | ... | ... |

# COMPUTER-READABLE NON-TRANSITORY STORAGE MEDIUM HAVING GAME PROGRAM STORED THEREIN, PROCESSING APPARATUS, PROCESSING SYSTEM, AND GAME PROCESS CONTROL METHOD

CROSS REFERENCE TO RELATED APPLICATION

This application is a continuation of application Ser. No. 16/574,481, filed Sep. 18, 2019, which claims priority of Japanese Patent Application No. 2019-020978, filed on Feb. 7, 2019, the entire contents of each of which are hereby incorporated by reference in this application.

FIELD

The exemplary embodiments relate to a game process in a versus game, and more particularly relates to a process for specifying an opponent to be attacked.

BACKGROUND AND SUMMARY

Hitherto, a versus game that is a so-called falling object game in which players play against each other has been known. In addition, in this game, two players can form a team and a 2 vs 2 team battle can be played. Moreover, in this game, one player in a first team can take balls accumulated in a predetermined range of a game field of the other player in the first team, as blocks. Furthermore, it is also indicated that, accordingly, accumulated balls reaching the upper end of the game field can be avoided, or the one player can attack an opponent team by using balls of the other player.

However, in the above technology, there is only one opponent team, and thus there is substantially no room for selection of an opponent to be attacked, or such selection is poor. In other words, in a game that independently proceeds for respective players, a method for selecting an opponent to be attacked is poor. That is, there is room for improvement of entertainment characteristics regarding strategy of the versus game in terms of selection of an opponent to be attacked.

Therefore, it is an object of the exemplary embodiments to provide a computer-readable non-transitory storage medium having a game program stored therein, a processing apparatus, a game process control method, and a processing system that are capable of further enhancing entertainment characteristics regarding strategy of a versus game.

In order to attain the object described above, for example, the following configuration examples are exemplified.

A configuration example is directed to a computer-readable non-transitory storage medium having stored therein a game program to be executed by a computer of a processing apparatus for providing a versus game to a user, the game program causing the computer to: perform a first game process that proceeds independently of a second game process related to opponents for the user, on the basis of an operation by the user; sequentially acquire state data indicating a second game state of the second game process related to each of a plurality of the opponents; sequentially generate a display image including a first image reflecting a first game state of the first game process, and a plurality of second images reflecting the second game states indicated by a plurality of the state data acquired; select at least one policy, on the basis of an operation by the user, from among a plurality of preset policies; specify at least one opponent as a target from among the plurality of the opponents on the basis of the selected policy; and make an instruction that changes a game state of the opponent specified as the target, if a game state of the user satisfies a predetermined condition.

According to the above configuration example, the user can select the game state of an opponent to be changed, among the plurality of the opponents, on the basis of the policy selected by the user, while performing the game process that proceeds independently of the opponents. Thus, entertainment characteristics regarding strategy of the versus game can be improved. In particular, when the user desires to select a certain opponent from many opponents, quick selection reflecting the intention of the user is enabled.

In another configuration example, the state data including specified information data indicating whether each of the plurality of the opponents has specified the user as a target may be sequentially acquired, and if the specified information data indicates that the opponent has specified the user as a target, the display image including a third image for making it possible to recognize that the opponent has specified the user as a target may be sequentially generated.

According to the above configuration example, it is possible to easily recognize which opponent is targeting the user, so that it is possible to improve a feeling of tension in the game.

In another configuration example, the second image may be generated on the basis of the acquired state data such that the second image includes ranking images that allow ranking of each of the plurality of the opponents to be recognized, and the second image may be included in the display image.

In another configuration example, if one of the opponents comes into a state where the game cannot be continued, the second image may be generated such that the second image includes the ranking image that allow the ranking of the one of the opponents fixed at a time when the one of the opponents comes into the state where the game cannot be continued, to be recognized, and the second image may be included in the display image.

According to the above configuration example, the user is allowed to recognize the ranking of the opponent, so that it is possible to easily recognize the progress state of the entire versus game.

In another configuration example, even after the game state of the user becomes a state where the game cannot be continued, the state data may continue to be sequentially acquired. Furthermore, even after the game state of the user becomes the state where the game cannot be continued, the display image including the second images may be sequentially generated on the basis of the state data.

According to the above configuration example, even after the user suffers a defeat in the versus game, the user can recognize the subsequent game states of all the opponents. Accordingly, even after the user suffers a defeat in the game, the user is allowed to enjoy the subsequent state and development of the versus game in which the user is participating.

In another configuration example, the display image may be sequentially generated such that the first image is arranged in a first area and the plurality of second images are arranged in a second area.

According to the above configuration example, in addition to the state of the game which the user progresses, the game states of the opponents can be presented to the user.

In another configuration example, the display image may be sequentially generated such that the first image is arranged in a first area located at a center of the display image and each of the second images is arranged in a second area located at a position different from that of the first area.

According to the above configuration example, the state of the game which the user progresses can be presented to the user in such a manner as to be easily distinguished from the state of the game which each opponent progresses.

In another configuration example, the display image may be sequentially generated such that the first image is arranged in a first area located at a center of the display image, a second area is located at a position at each of right and left sides of the first area, and the second images are arranged in the respective second areas at the right and left sides.

According to the above configuration example, the game image of the game which the user progresses can be displayed at the center. Images showing the game states of the opponents can be displayed at the right and left sides of the game image. Accordingly, movement of the line of sight of the user between the game image of the user and the images showing the game states of the opponents can be minimized.

In another configuration example, a display image in which a target image is superimposed on the second image generated on the basis of the state data indicating a play state of the game of the opponent specified as the target, may be sequentially generated.

According to the above configuration example, it is possible to easily recognize the opponent presently targeted by the user themselves.

In another configuration example, the versus game may be a puzzle game of deleting puzzle objects the number of which increases over time, in a play field. Furthermore, the instruction that increases the number of puzzle objects for the opponent specified as the target may be made. The game program may further cause the computer to: determine that the game state is a game state where the game cannot be continued, if an arrangement state of the puzzle objects within the play field satisfies a defeat condition; and determine that a victory condition is satisfied, if the user remains, until the end, without satisfying the defeat condition among the user and the plurality of the opponents.

According to the above configuration example, a versus puzzle game, in which a user aims to make an instruction to change the game state of an opponent as appropriate while progressing the game of the user themselves and to continue to play until the end without satisfying the defeat condition, can be provided to the user.

In another configuration example, the game program may further cause the computer to add a value to a user parameter associated with the user that indicates how many opponents the user has defeated, if the game state of the one of the opponents specified as the target by the user satisfies the defeat condition due to the puzzle objects increasing as a result of the instruction made by the information processing apparatus of the user. Furthermore, the state data may include information of an opponent parameter associated with the one of the opponents that indicates how many opponents the one of the opponents has defeated, and the second image including information indicating the opponent parameter may be generated on the basis of the information.

According to the above configuration example, it is possible to easily recognize the user who has caused many opponents to be defeated.

In another configuration example, the value based on the opponent parameter may be added to the user parameter.

According to the above configuration example, the strategic characteristics of the versus game are enhanced, so that the entertainment characteristics of the game can be enhanced.

In another configuration example, if the selected policy is a first policy, the one of the opponents having the largest opponent parameter may be specified as the target.

According to the above configuration example, by targeting the user having a large opponent parameter, the user parameter is allowed to be easily increased.

In another configuration example, if the selected policy is a second policy, an opponent who has specified the user as a target may be specified as a target for the user on the basis of the specified information.

According to the above configuration example, the opponent who has set the user themselves as a target can be set as a target for the user themselves. Accordingly, when the user is targeted by many opponents, an operation of selecting these opponents as targets can be easily performed. In addition, a one-sidedly disadvantageous situation for the user is prevented from arising, so that the balance of the game can be made appropriate.

If the selected policy is a third policy, an opponent closest to the defeat condition may be specified as a target for the user.

At least one opponent may be specified as the target from among the plurality of the opponents on the basis of an instruction by the user regardless of the selected policy.

If the selected policy is a fourth policy, a randomly determined opponent may be specified as a target for the user.

According to the exemplary embodiments, when the user desires to select a certain opponent from many opponents, a quick selection operation reflecting the intention of the user can be performed.

BRIEF DESCRIPTION OF THE DRAWINGS

FIG. 22 shows a non-limiting example of the data structure of update data 306;

FIG. 23 shows a non-limiting example of the structure of opponent data 307;

DETAILED DESCRIPTION OF NON-LIMITING EXAMPLE EMBODIMENTS

Figure 1:
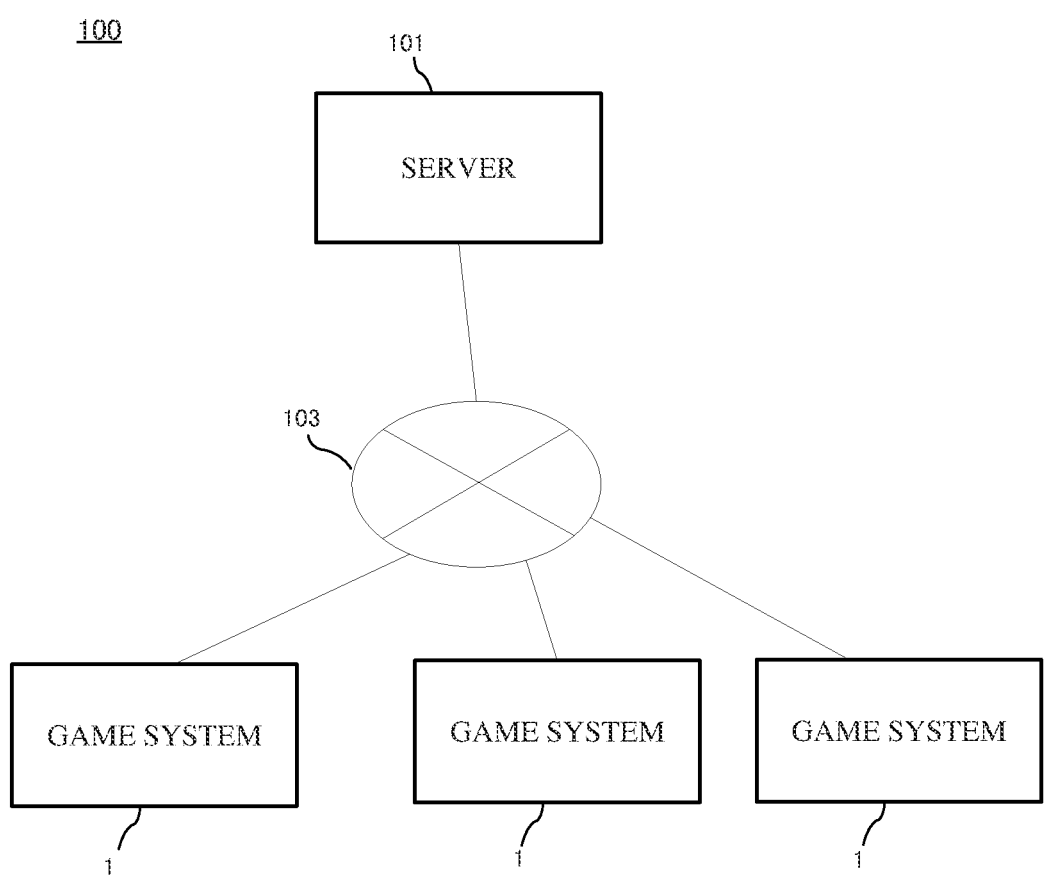
FIG. 1 is a schematic diagram showing the whole image of a non-limiting example information processing system according to an exemplary embodiment.

Hereinafter, an exemplary embodiment will be described. FIG. 1 is a schematic diagram showing the whole image of an information processing system according to the exemplary embodiment. The information processing system 100 according to the exemplary embodiment includes a server 101 and a plurality of game systems 1. The server 101 and each game system 1 are configured to be able to communicate with each other via the internet 103.

As an example of information processing executed in the above configuration, a game process will be described in the exemplary embodiment. Specifically, while, in each game system 1, a game process that proceeds independently of the other game systems 1 is performed on the basis of operations by a single user, predetermined data based on the game process is transmitted and received between the game systems 1 via the server 101, whereby a game process that realizes a multiplayer versus game is performed.

Figure 2:
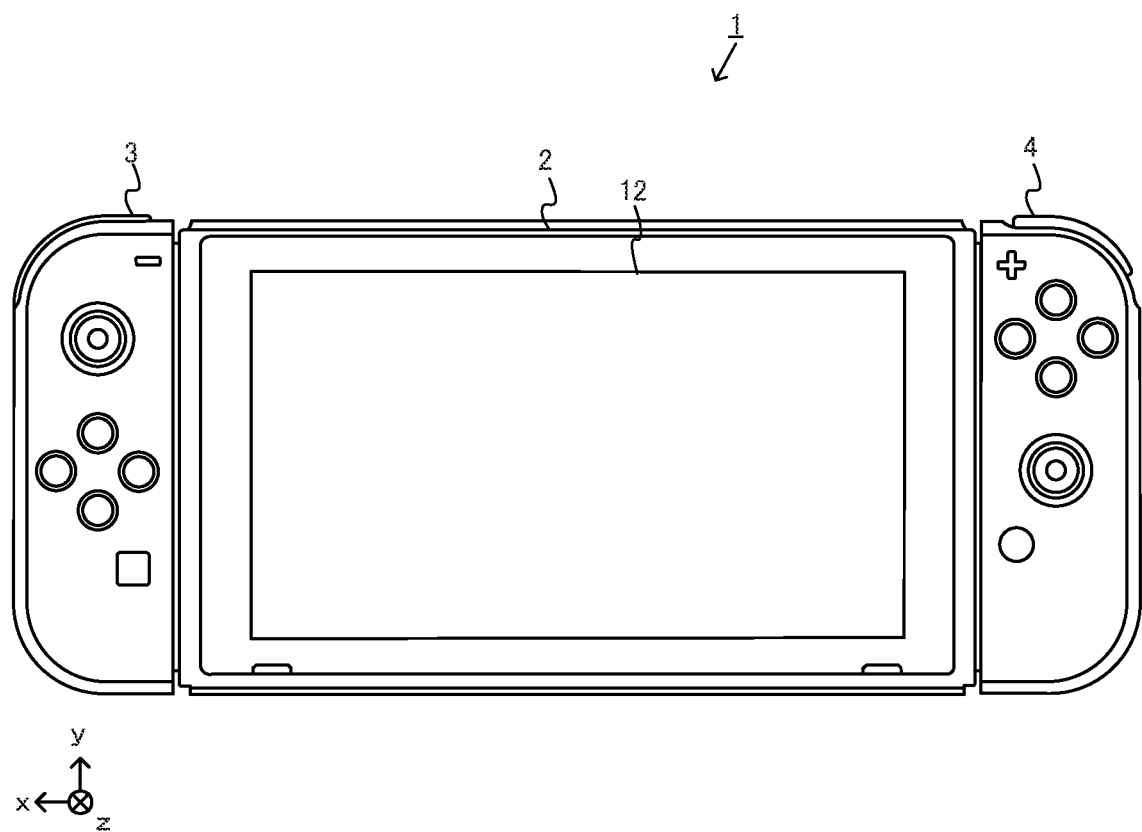
FIG. 2 is an external view of a non-limiting example game system.

Next, the game system 1 according to the exemplary embodiment will be described. This game system may be any system. As an example, FIG. 2 shows the external view of a game system used in this example. The game system 1 shown in FIG. 2 includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Furthermore, in the game system 1, the main body apparatus 2, the left controller 3, and the right controller 4 can also be used as separate bodies. FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., a game process) in the game system 1. The main body apparatus 2 includes a display 12. Each of the left controller 3 and the right controller 4 is an apparatus including operation sections with which a user provides inputs.

Figure 3:
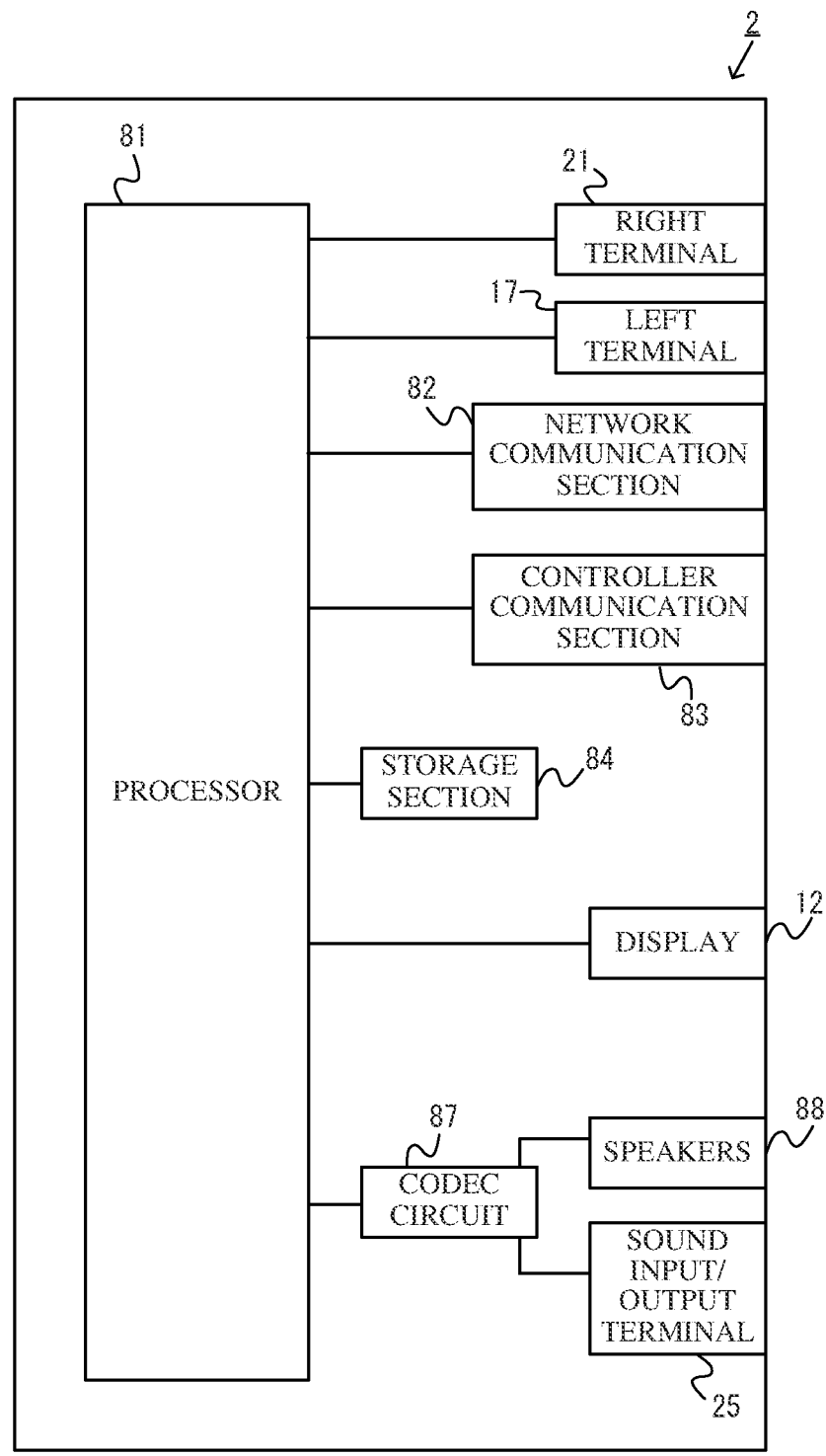
FIG. 3 is a block diagram showing a non-limiting example of the internal configuration of a main body apparatus 2.

FIG. 3 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Furthermore, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. In the case of using the main body apparatus 2 and the left controller 3 and the right controller 4 as separate bodies, the controller communication section 83 wirelessly communicates with the left controller 3 and/or the right controller 4. The method for communication between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Furthermore, the main body apparatus 2 includes: a left terminal 17 that is a terminal for the main body apparatus 2 to perform wired communication with the left controller 3; and a right terminal 21 that is a terminal for the main body apparatus 2 to perform wired communication with the right controller 4.

Furthermore, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Although not shown, it is also possible to output an image and sound generated by the main body apparatus 2, to an external monitor/external speaker via a predetermined output terminal.

[Controllers]

Although not shown, the left controller 3 and the right controller 4 each include a communication control section that communicates with the main body apparatus 2. In a state where the left controller 3 and the right controller 4 are attached to the main body apparatus 2, wired communication can be performed via the left terminal 17 and the right terminal 21. Moreover, in the case of using the main body apparatus 2 and the left controller 3 and the right controller 4 as separate bodies, communication with the main body apparatus 2 can be performed through wireless communication without being performed via the terminals. The communication control section acquires information regarding an input (specifically, information regarding an operation) from each input section of the controller. Then, the communication control section transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

[Hardware Configuration of Sever]

Figure 4:
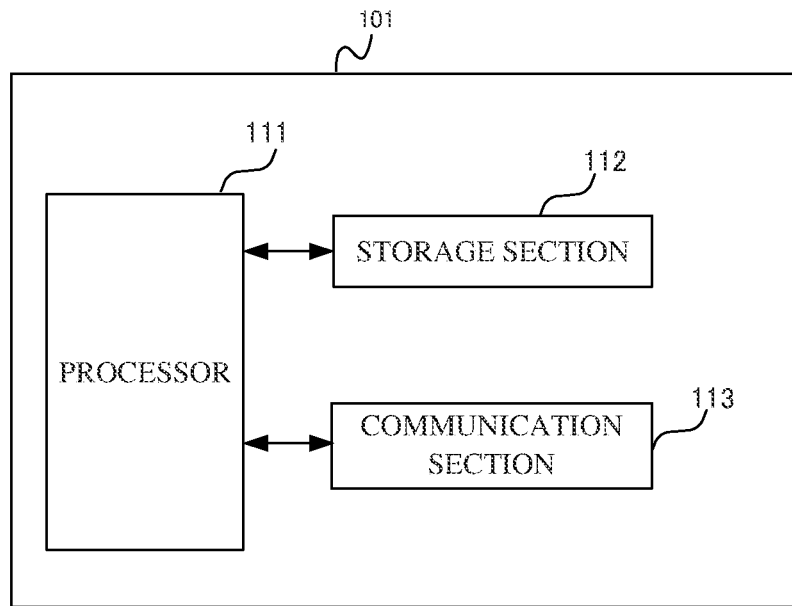
FIG. 4 is a block diagram showing a non-limiting example of the internal configuration of a server 101.

Next, the configuration of the server 101 will be described. FIG. 4 is a block diagram showing an example of the internal configuration of the server 101. The server 101 includes at least a processor 111, a storage section 112, and a communication section 113. The processor 111 executes various programs for controlling the server 101. The various programs to be executed by the processor 111 and various kinds of data to be used by the processor 111 are stored in the storage section 112. The communication section 113 connects to the internet 103 by wired or wireless communication and transmits/receives predetermined data to/from the game systems 1.

[Outline of Game Process]

Next, an outline of the game process performed in the exemplary embodiment will be described. In the exemplary embodiment, as an example of the game process, a puzzle game process of deleting "puzzle objects", the number of which increases over time, is performed. Specifically, in the exemplary embodiment, an action puzzle game process of, in a two-dimensional play field, moving/rotating and stacking puzzle objects that fall one by one over time from the upper side of the play field, and deleting at least some of the stacked puzzle objects when a predetermined condition is satisfied, is performed (a game process also referred to as "falling object puzzle"). The puzzle objects are, for example, lattice-shaped blocks, capsule-shaped pieces, panels having a predetermined shape, or the like. In addition, examples of the predetermined condition include filling one horizontal line with blocks, aligning a predetermined number or more of panels having the same color in a certain direction, aligning a predetermined number or more of panels having the same pattern, aligning a predetermined number or more of pieces having the same shape, and forming a predetermined shape (a square, etc.) with blocks having the same color. In the exemplary embodiment, as the play field, a play field having 20 vertical×10 horizontal cells is assumed, and, for example, block groups forming various shapes fall as puzzle objects. Furthermore, the case where, when one horizontal line in the play field is filled with blocks, the blocks are deleted, will be described as an example of the predetermined condition. For example, each user performs an operation of moving a block group falling from the upper portion of a play field 1511, in the right-left direction or in the downward direction, or rotating the block group. Then, the user can fix the position of the block by causing the block to fall onto the lowermost stage of the play field or another block that has already been stacked. As a result, if one horizontal line is filled with blocks, the blocks in the one horizontal line are deleted. In addition, if blocks are stacked up to the uppermost stage of the play field, the game becomes over.

Moreover, as the puzzle game process according to the exemplary embodiment, a game process in which up to 99 users can compete with each other is assumed. An outline of the competition will be described. First, a victory condition for the competition is "remaining until the end without the game being over among 99 users". In this game, while each user individually progresses a puzzle game, the user can interfere with game progress of a predetermined other user by sending later-described "obstruction blocks" to the predetermined other user. As described above, each user aims to progress their own puzzle game while trying to obstruct other users' game progress, and to continue to play until the end without the game being over. In the following, sending "obstruction blocks" to another user as described above is referred to as "attack" against the other user.

Figure 5:
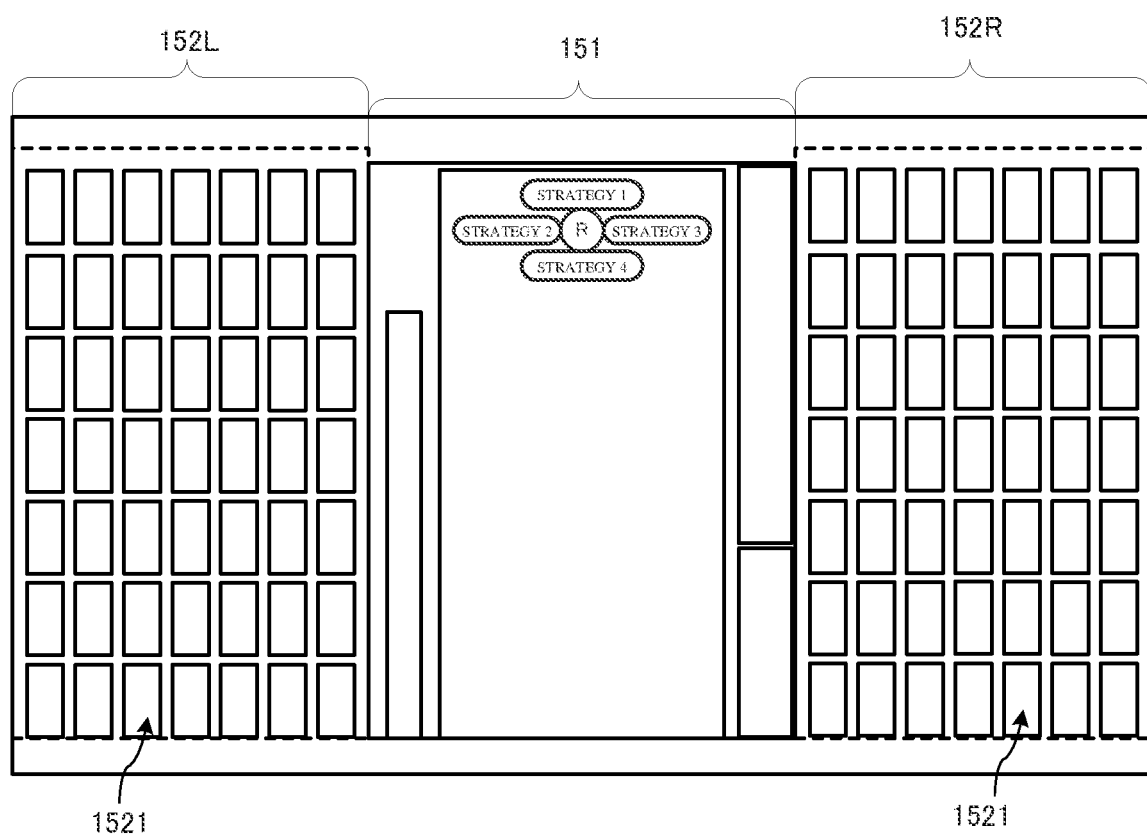
FIG. 5 shows a non-limiting example of a game screen according to the exemplary embodiment.

More specifically, a game image shown in FIG. 5 that is an example of a display image is displayed on the display 12 of each game system 1. Although the components of the game image will be described in detail later, each user performs an operation related to the puzzle game on the later-described play field 1511 and individually progresses the puzzle game process. In other words, basically, only the contents of operation data generated by each user operating the own controller are reflected in the play field of the user. That is, objects or the like for which operation data related to controllers operated by the other users are directly reflected are not present within the play field. For example, this game is not a versus game in which characters or the like operated by a plurality of users, respectively, are present within the same stage or the same game field, and operations of the respective users are reflected therein, such as a fighting versus game and a racing game. In this game, when the blocks are deleted, an attack against another user who is set as a "target" at that time can be made by sending special blocks referred to as the above "obstruction blocks", to the other user. In addition, conversely, "obstruction blocks" may be sent from other users. That is, in the exemplary embodiment, data regarding the "obstruction blocks" and data indicating a play field state of each user are transmitted and received to and from other users. Accordingly, in each game system 1, while the puzzle game is individually progressed, an image in which the play field states of the other users are reflected is also displayed on the basis of the transmitted and received data, thereby allowing the states of the other users to be recognized. Moreover, "attacks" made between users are also reflected. That is, the versus game process according to the exemplary embodiment is realized by linking the game processes between the game systems 1 using the transmitted and received data while individually progressing the puzzle game process in each game system 1.

[Game Image Examples]

Next, the components of the game image in the puzzle game process, and users' operations and gimmicks associated therewith will be described. FIG. 5 shows an example of a game image in the puzzle game displayed on the display 12 of each game system 1. In FIG. 5, a first area 151, a second area 152L, and a second area 152R (hereinafter, sometimes collectively referred to as second area 152) are shown. The first area 151 is located at substantially the center of the game image, and the second area 152L is located at the left side of the first area 151. In addition, the second area 152R is located at the right side of the first area 151. Various images regarding the puzzle game which proceeds in accordance with operations by the user of the game system 1 are mainly displayed in the first area 151. Images indicating the states of the play fields of the puzzle games played by the other users are displayed in the second areas 152L and 152R. In the following, the other users are referred to as "opponents".

Figure 6:
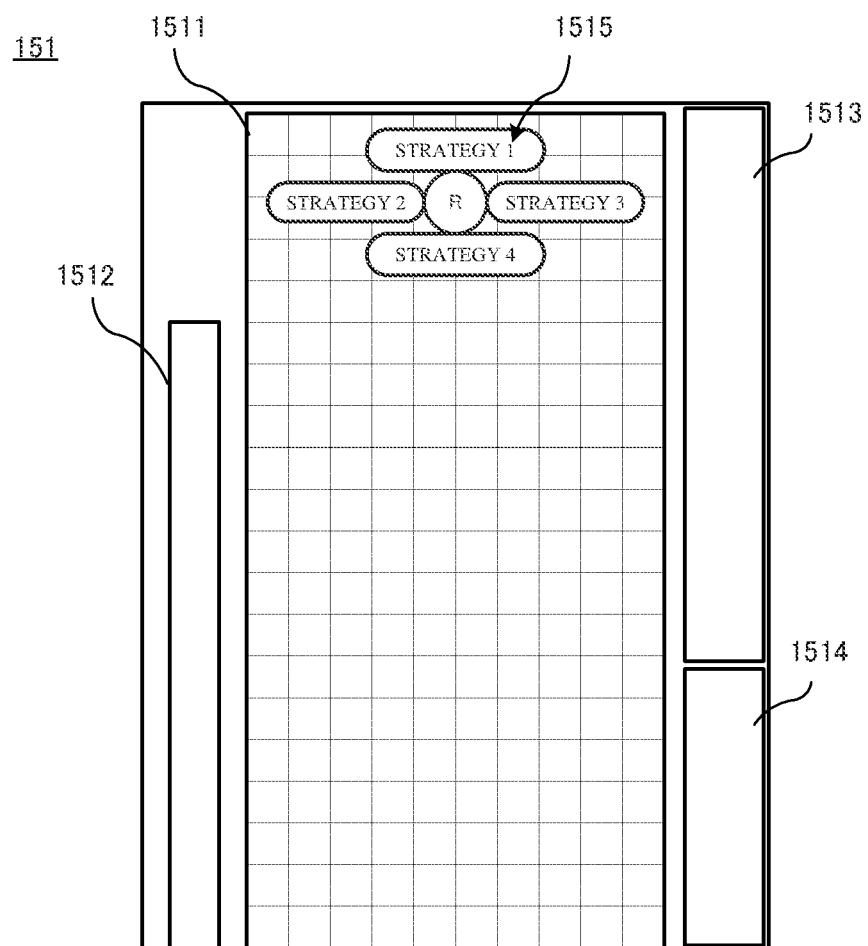
FIG. 6 is an enlarged view of a first area 151.

Next, the first area 151 will be described in detail. FIG. 6 is an enlarged view of the first area 151. In FIG. 6, the play field 1511, a wait block area 1512, a next block area 1513, and a badge display area 1514 are displayed in the first area 151. In addition, a strategy operation panel 1515 is also displayed near the upper end of the play field 1511.

The play field 1511 is a two-dimensional field composed of 10 horizontal cells×20 vertical cells, and is also a main portion in the puzzle game. The above block group falls from the upper side of the play field 1511 toward the lower side of the play field 1511. As described above, the user can perform an operation of moving the block group rightward or leftward or rotating the block group within the play field 1511. Then, when one horizontal line is filled with stacked blocks, the blocks can be deleted. In FIG. 6, each cell is demarcated by dotted lines, but, in an actual game image, such lines for indicating the cells may or may not be displayed.

Next, the wait block area 1512 is an area for displaying information regarding "obstruction blocks" sent from opponents. Contents displayed in this area will be described later together with description of "obstruction blocks".

The next block area 1513 is an area for presenting block groups that are to fall. In this game, blocks having various shapes fall one by one, and the order in which these blocks fall is the same for all the 99 users.

The badge display area 1514 is an area for displaying "badges" acquired by the user. The "badges" indicate the number of opponents whose games have been over due to "obstruction blocks" sent by the user (namely, the number of opponents to which a finishing blow has been delivered by the user). The "badges" will be described in detail later.

The strategy operation panel 1515 is an operation panel for selecting a "strategy". Although described in detail later, the "strategy" is an example of a policy for selecting an opponent to be attacked (to which obstruction blocks are to be sent) (hereafter, referred to as a target). The processor 81 sets a certain user as a "target" from among 98 opponents on the basis of the strategy selected at that time. In the exemplary embodiment, an analog stick of the right controller 4 is used for an operation for selecting the strategy. By tilting the analog stick in an upward, downward, leftward, or rightward direction, one of four strategies corresponding to the respective directions is selected. In FIG. 6, a circular image representing the analog stick is displayed at substantially the center of the strategy operation panel 1515, and option images indicating strategy names are displayed in the upward, downward, leftward, and rightward directions, respectively. With such a configuration, it is possible to quickly perform a strategy selection operation without disturbing puzzle game operations (an operation for moving or rotating a block) by the user as much as possible.

Next, the second areas 152L and 152R shown in FIG. 5 will be described. As described above, the second area 152L is located at the left side of the first area 151, and the second area 152R is located at the right side of the first area 151. In the second area 152L, 49 opponent images 1521 indicating the states of the play fields 1511 of 49 opponents among the 98 opponents are displayed in a 7×7 array. In addition, in the second area 152R, 49 opponent images 1521 indicating the states of the play fields 1511 of the other 49 opponents are similarly displayed in a 7×7 array.

[Attacks]

Next, an attack against an opponent, that is, sending "obstruction blocks" to an opponent, will be described. The "obstruction blocks" are an example of an element that changes the state of the play field of the opponent. By sending "obstruction blocks" as described below, a highly tactical versus game can be provided.

Figure 7:
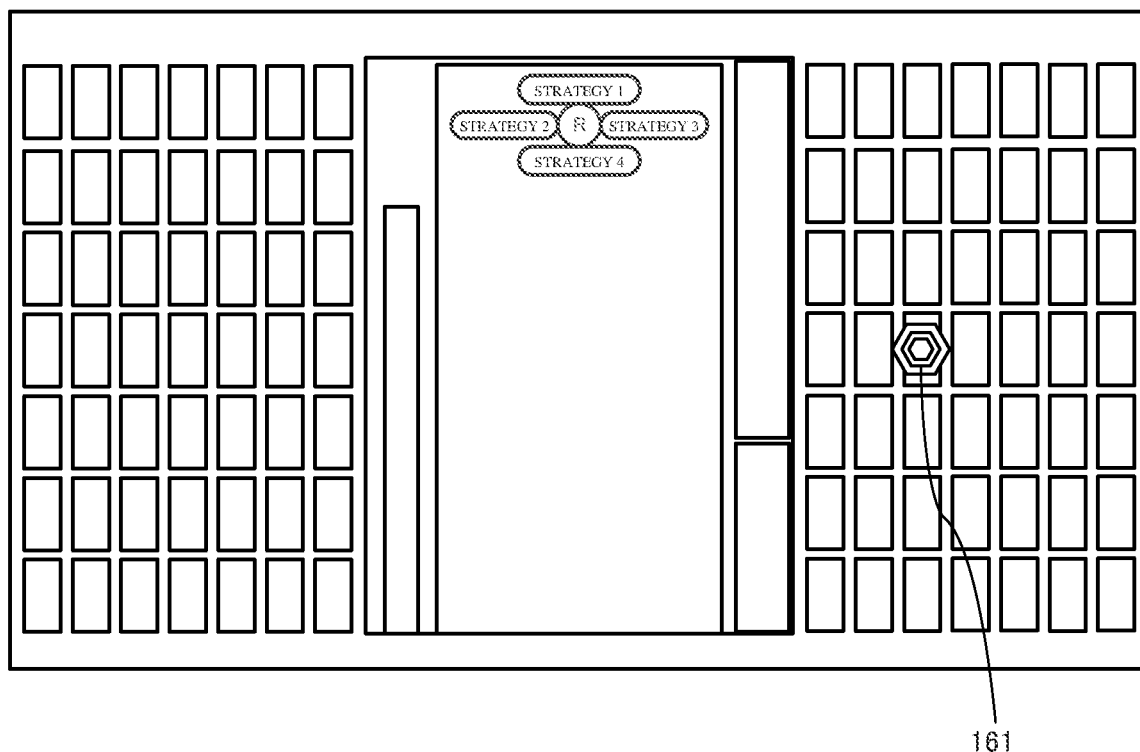
FIG. 7 shows a non-limiting example of a game image according to the exemplary embodiment.

First, the case where the user themselves attacks against an opponent will be described. In this game, first, it is necessary to determine an opponent to which "obstruction blocks" are to be sent, that is, the "target". The "target" is set by the processor 81 in accordance with a later-described "strategy". In principle, only one opponent can be set as the "target". However, in the case of "counter aim" among later-described "strategies", it is possible to set a plurality of opponents as "targets". In the opponent image 1521 for the opponent set as the "target", a target image 161 is displayed so as to be superimposed thereon as shown in FIG. 7. Accordingly, the user is allowed to easily recognize whether that opponent is set as the "target".

Figure 8:
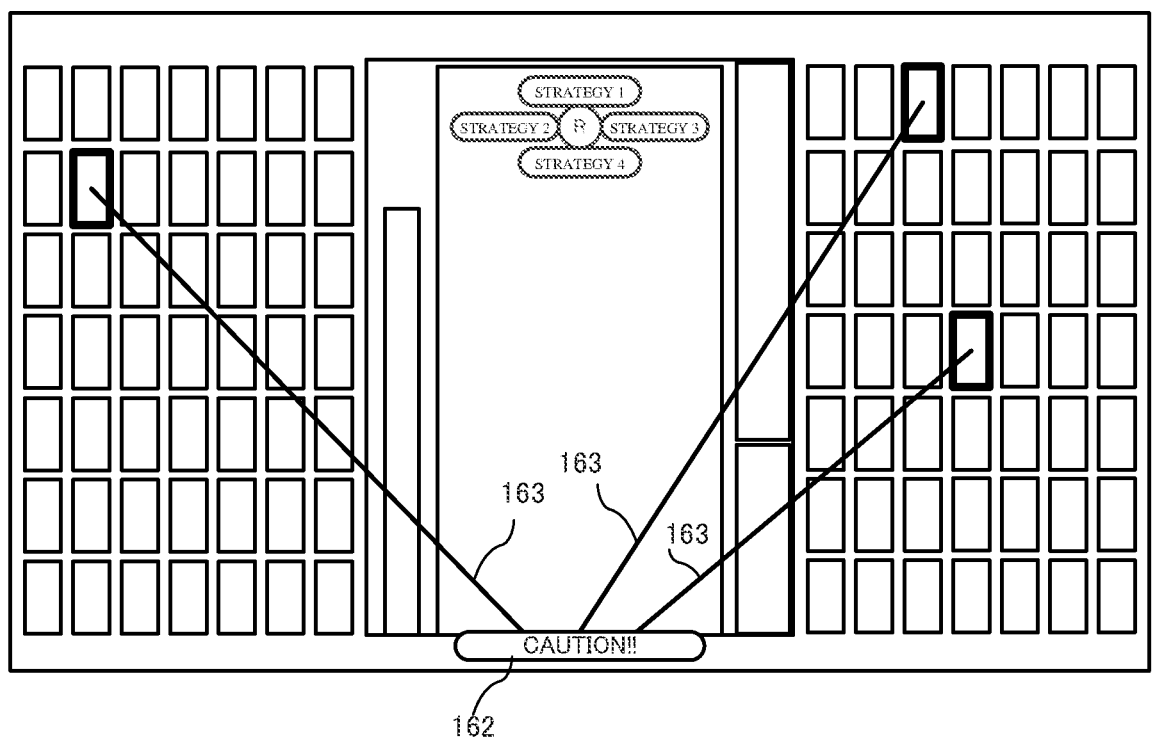
FIG. 8 shows a non-limiting example of the game image according to the exemplary embodiment.

Next, display of a game image in the case where the user themselves is set as a "target" for other users will be described. In this case, as shown in FIG. 8, a "CAUTION" panel 162 is displayed at a lower portion of the play field 1511. Furthermore, straight lines 163 that connect the "CAUTION" panel 162 to (the central points of) the opponent images 1521 for the opponents who set the user themselves as a "target" are also displayed. Moreover, each of the opponent images 1521 for the opponents who set the user themselves as a "target" is changed to a display form in which the opponent image 1521 is surrounded by a thick frame. As a result of performing such display, particularly, in a game in which many opponents are present as assumed in the exemplary embodiment, it is possible to easily recognize, for example, which opponents set the user themselves as a "target" and how many opponents set the user themselves as a "target" when the user themselves is set as a "target" for opponents. The method for indicating that the user is set as a "target" as described above is not limited to displaying an image using the "CAUTION" panel 162 and the straight lines 163 as in this example. Any image and any display form may be used as long as the purpose of making it possible to recognize that an opponent specifies the user as a "target" can be achieved.

Opponents who are set as a target and opponents who set the user as a target change moment by moment in accordance with the later-described "strategy". Thus, even when the "strategy" is not particularly changed, the positions at which the target image 161 and the straight lines 163 are displayed can change moment by moment.

When the user deletes blocks in a state where the "target" is set as described above, "obstruction blocks" corresponding to the deleted contents (specifically, the number of lines deleted) can be sent to an opponent who is set as a "target". In addition, conversely, "obstruction blocks" may be sent from an opponent who sets the user themselves as a "target". Hereinafter, operation in the case where "obstruction blocks" are sent from another user will be described with reference to FIGS. 9 to 12.

Figure 9:
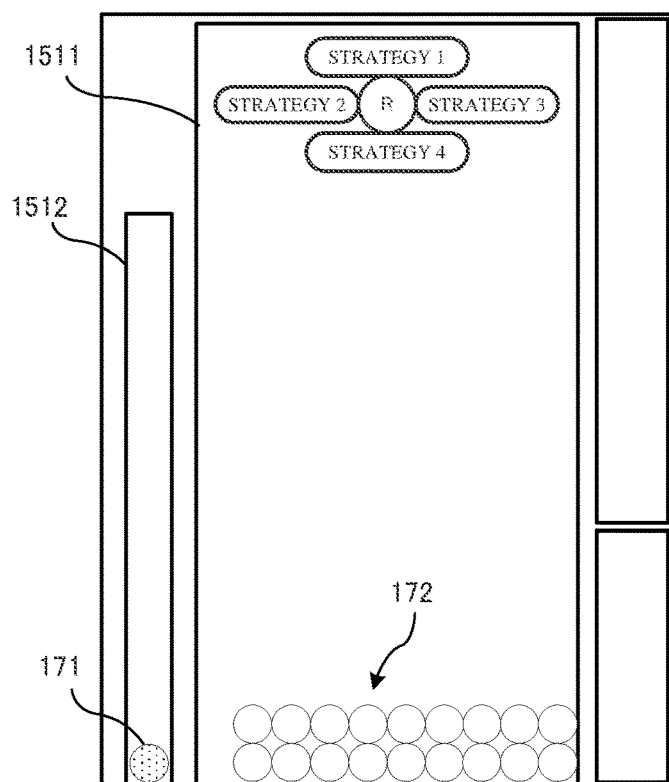
FIG. 9 is an enlarged view of the first area 151.

FIG. 9 is an enlarged view of the first area 151. This drawing shows a state where a 2 vertical×9 horizontal block group 172 is stacked in the play field 1511. In addition, one block image 171 is displayed in the wait block area 1512. The block image 171 is an image indicating obstruction blocks sent from an opponent. In this game, when obstruction blocks are sent from an opponent, the block image 171 is displayed once in the wait block area 1512. Thereafter, after waiting for a predetermined waiting time, obstruction blocks corresponding to the block image 171 appear (rise) in the play field 1511 from the lower side of the play field 1511. In the following, the obstruction blocks that are waiting are referred to as "waiting blocks", and the block image 171 is referred to as "wait block image".

Figure 10:
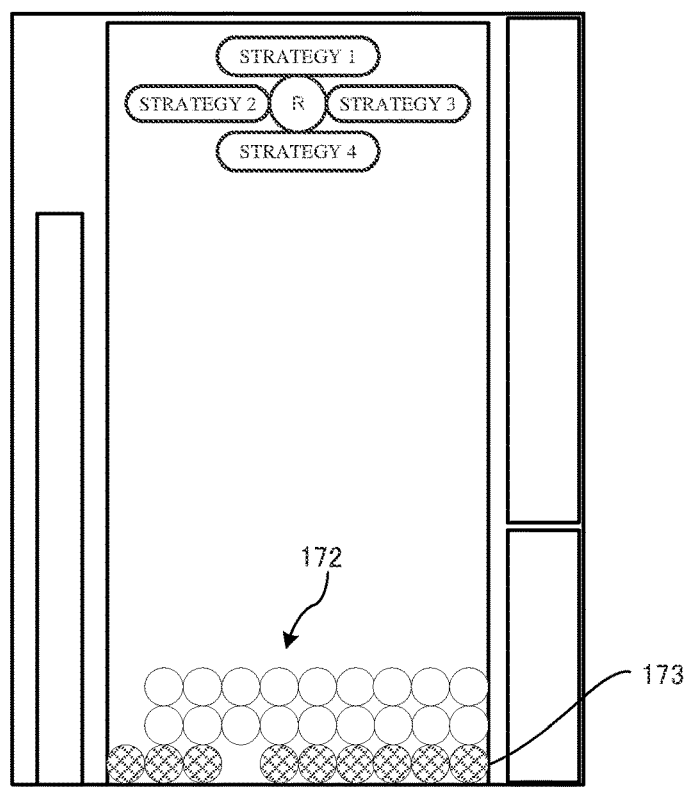
FIG. 10 is an enlarged view of the first area 151.

FIG. 10 is a diagram showing a state where obstruction blocks 173 appear in the play field 1511 after the waiting time elapses. In FIG. 10, the obstruction blocks 173 filling 9 cells except the fourth cell from left are displayed in the lowermost line in the play field 1511. Here, in the exemplary embodiment, as for the contents of the obstruction blocks 173, blocks for 9 cells except one cell made empty in one horizontal line are generated as the obstruction blocks 173. In addition, the corresponding wait block image 171 is deleted from the wait block area 1512 with appearance of the obstruction blocks 173.

Figure 11:
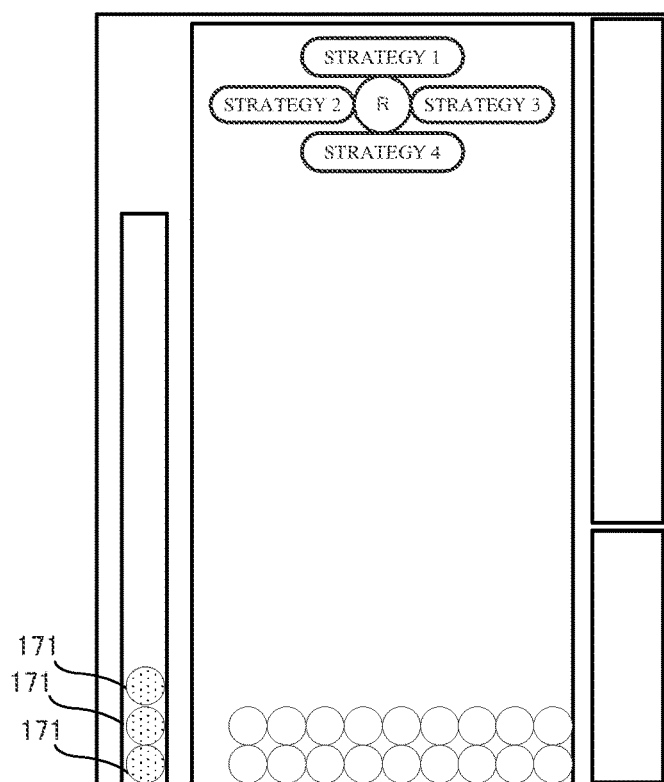
FIG. 11 is an enlarged view of the first area 151.
Figure 12:
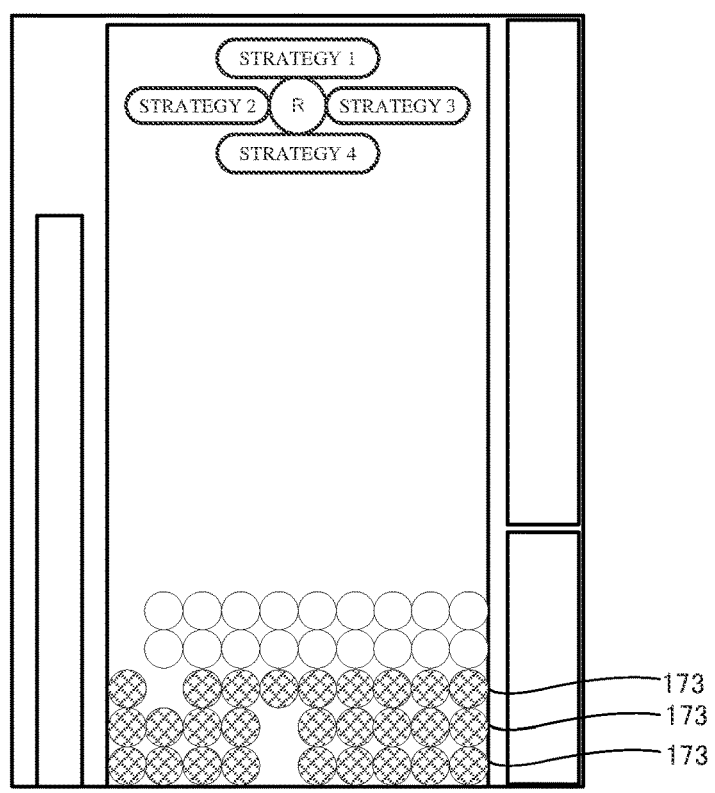
FIG. 12 is an enlarged view of the first area 151.

Here, the number of wait block images 171 displayed in the wait block area 1512 corresponds to the number of lines in which obstruction blocks 173 are to appear. In the example in FIGS. 9 and 10, only one wait block image 171 is present, and thus obstruction blocks 173 only for one line also appear. In this respect, for example, when three wait block images 171 are displayed as shown in FIG. 11, obstruction blocks 173 for three lines appear as shown in FIG. 12.

[Cancellation]

Next, "cancellation" of obstruction blocks will be described. By the user deleting blocks within the play field 1511 while the wait block image 171 is displayed in the wait block area 1512 as described above, the waiting block image 171 can be deleted in accordance with the number of lines deleted. That is, when waiting blocks are present, the waiting blocks can be cancelled out by the user deleting blocks. For example, when one wait block is present, if the user deletes blocks in three lines, the blocks in one line out of the three lines deleted and the wait block are canceled out.

As a result, the wait block is eliminated. In addition, obstruction blocks are sent to another user who is set as a "target" by the user at that time, on the basis of the deletion of the blocks in the other two lines. Moreover, as another example, when five wait blocks are present and the user deletes blocks in three lines, three of the waiting blocks are cancelled out by the deletion of the blocks in the three lines. As a result, the number of waiting blocks becomes two. As described above, by allowing obstruction blocks sent to the user themselves to be prevented from appearing, the strategic characteristics of the game are enhanced.

[Badges]

Figure 13:
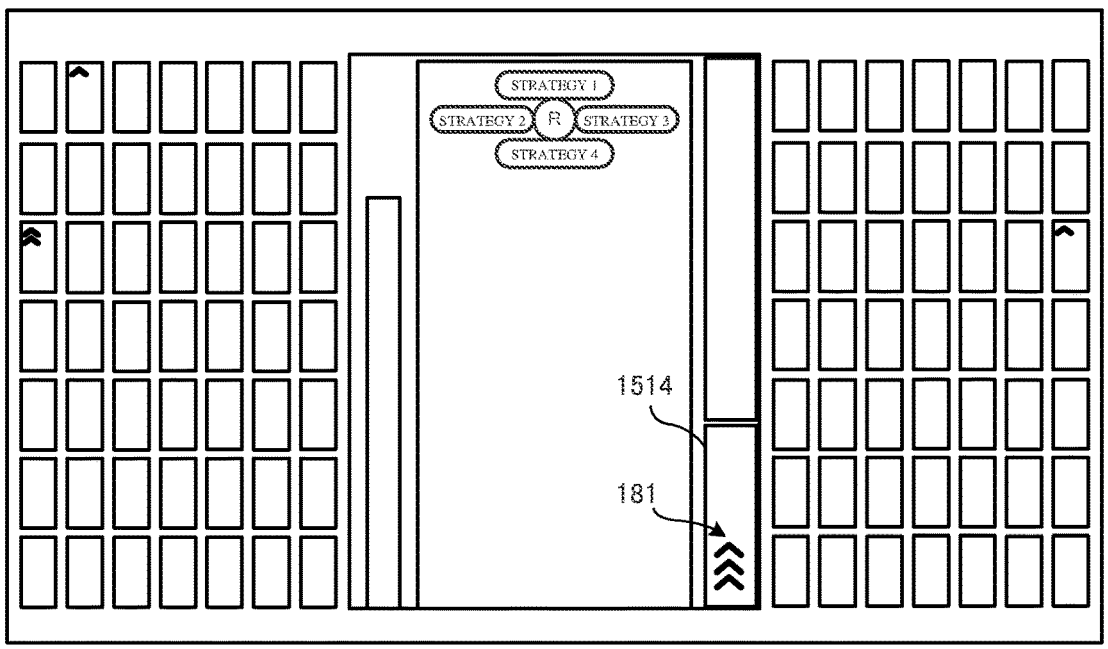
FIG. 13 shows a non-limiting example of the game image according to the exemplary embodiment.

Next, the "badges" that are an example of a component for indicating information indicating the number of opponents caused to be defeated, that is, how many opponents the user has defeated will be described. In this game, if blocks are stacked up to the upper end of the game field, the game becomes over. The obstruction blocks appear so as to rise from the lower side of the game field. Therefore, as a result of appearance of the obstruction blocks, blocks may reach the upper end of the game field, so that the game may become over. In this game, when, due to appearance of obstruction blocks sent to a "target" by the user, the game of the "target" becomes over, the user can acquire one badge. In other words, when a finishing blow is delivered to the "target" by an attack of the user themselves, the user can acquire one badge. In addition, the badges can be considered as information indicating the number of opponents caused to be defeated. Information indicating the number of badges acquired in this manner is displayed as information of a user parameter in the badge display area 1514. FIG. 13 is an example of a game image indicating information regarding the badges. In FIG. 13, three badge images 181 are displayed in the badge display area 1514. That is, it is indicated that the user has acquired three badges. In another embodiment, a component other than the badges as in this example may be used as information indicating the number of opponents caused to be defeated.

Figure 14:
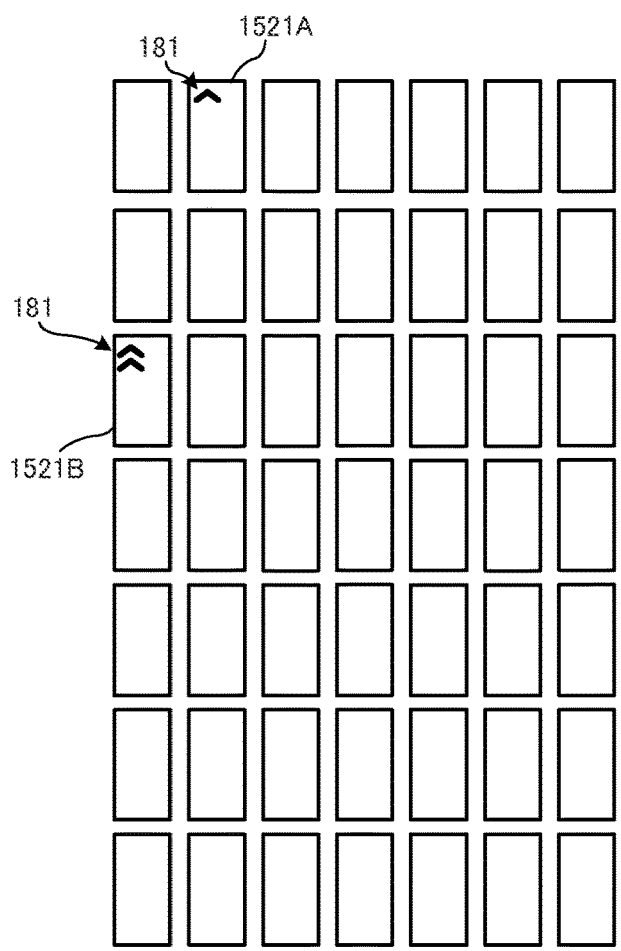
FIG. 14 is an enlarged view of a second area 152L in FIG. 13.

Moreover, in this game, information of the number of badges possessed by another user is also displayed as information of an opponent parameter in the opponent image 1521. FIG. 14 shows an enlarged view of the second area 152L in FIG. 13. In FIG. 14, one badge image 181 is displayed near the upper left end in an opponent image 1521A. In addition, two badge images 181 are displayed near the upper left end in an opponent image 1521B. This indicates that the user of the opponent image 1521A possesses one badge and also indicates that the user of the opponent image 1521B possesses two badges. When the user causes the game of an opponent, who already has possessed a badge as described above, to be over, the user can acquire one badge as described above, and can also acquire the badge possessed by the opponent. For example, when the user causes the game of an opponent, who possesses two badges, to be over, the user can acquire 1+2 badges, that is, three badges in total.

Moreover, in this game, the number of lines in which the obstruction blocks 173 are to be caused to appear can be changed in accordance with the number of badges possessed. In the following, the number of lines in which the obstruction blocks 173 are to be caused to appear (in other words, the number of the wait blocks) is referred to as "attack power". In this example, for example, when the attack power is "1", the obstruction blocks 173 for one line can be caused to appear. By adding attack power corresponding to the number of badges possessed to attack power corresponding to the number of lines actually deleted by the user (hereinafter, referred to as basic attack power), the number of lines in which the obstruction blocks 173 are to be caused to appear in the play field 1511 of an opponent is finally determined. As an example, the case where the user deletes blocks in one line is assumed. In this case, the basic attack power is "1". In such case, when the user possesses one or two badges, "1" is added to the attack power, so that the final attack power is "2". As a result, the obstruction blocks 173 for two lines can be caused to appear in the play field of the opponent. Moreover, for example, when the user possesses three or four badges, "2" is added to the attack power, so that the final attack power is "3". Furthermore, for example, when the user possesses five or six badges, "3" is added to the attack power, so that the final attack power is "4". As described above, when the user possesses many badges, the "attack power" can be increased, so that an element of "scramble for badges" is introduced to the game and the entertainment characteristics of the game can be enhanced.

[Pinch State]

Meanwhile, in this game, when a stacked block reaches any of the cells in the upper five lines in the play field 1511, this state is handled as a "pinch state" that is a state where there is a high risk of the game being over. When the user comes into the "pinch state", a change in display form that indicates that the user is in the pinch state is made, for example, the play field 1511 is surrounded with a red frame. Moreover, when an opponent comes into the "pinch state", the display form of the opponent image 1521 for this user is changed so as to indicate that this user is in the "pinch state", for example, the opponent image 1521 is displayed in a blinking manner. Accordingly, the user is allowed to easily recognize the presence of the opponent who is in the "pinch state". In addition, the user is allowed to easily recognize that the user themselves is in the "pinch state".

[Strategies]

Next, the above-described strategies will be described. In this game, the strategies are used as policies for determining a "target" from among opponents whose games are not yet over. First, the significance of the strategies will be described. In this game, as many as 99 players compete with each other, and, excluding the user themselves, 98 opponents are present. In addition, it is necessary to select a "target" in this game as described above. As the method for selecting the "target", for example, causing the user to perform an operation of directly selecting any one opponent image from among the 98 opponent images displayed in total in the second area 152 is conceivable. For example, the user is caused to move a selection cursor, or is caused to perform a touch operation in the case where a touch panel screen is used. However, in an action puzzle game like this game, such an operation needs to be performed in real time to some extent. Thus, it is considered difficult to perform an operation of examining and selecting an opponent as a "target" from such a large number of the opponents in parallel with operations for falling blocks. Therefore, in the exemplary embodiment, strategies that are policies for selecting a "target" are presented to the user, and are selectable by a simple operation that can be performed in parallel with operations for the puzzle game. Then, as for actual selection of a "target", the processor 81 performs a process of selecting a certain opponent on the basis of the selected strategy and setting the selected opponent as a "target".

Next, examples of the strategies defined in this game will be described. In this game, the following four strategies are presented to the user such that the strategies are selectable.

The character strings indicating the names of these strategies are displayed in the option images of the strategy operation panel 1515 shown in FIG. 6.

Strategy 1: finishing blow aim
Strategy 2: random
Strategy 3: badge aim
Strategy 4: counter Hereinafter, each strategy will be described.

[Strategy 1: Finishing Blow Aim]

This strategy is a strategy as a policy of setting, as a "target", an opponent who is in the "pinch state". If the user selects this strategy, an opponent who is in the "pinch state" is selected as a "target". That is, this strategy can be considered as a strategy of aiming at an opponent whose game seems to be easily caused to be over. When a plurality of opponents who are in the "pinch state" are present, for example, an opponent having the largest number of blocks stacked may be selected as a "target". Alternatively, one opponent may be randomly selected from the plurality of opponents who are in the "pinch state".

[Strategy 2: Random]

This strategy is a strategy of randomly selecting one user from opponents whose games are not yet over and setting the selected user as a "target". In this game, this strategy is selected as a default immediately after start of the game.

[Strategy 3: Badge Aim]

Figure 15:
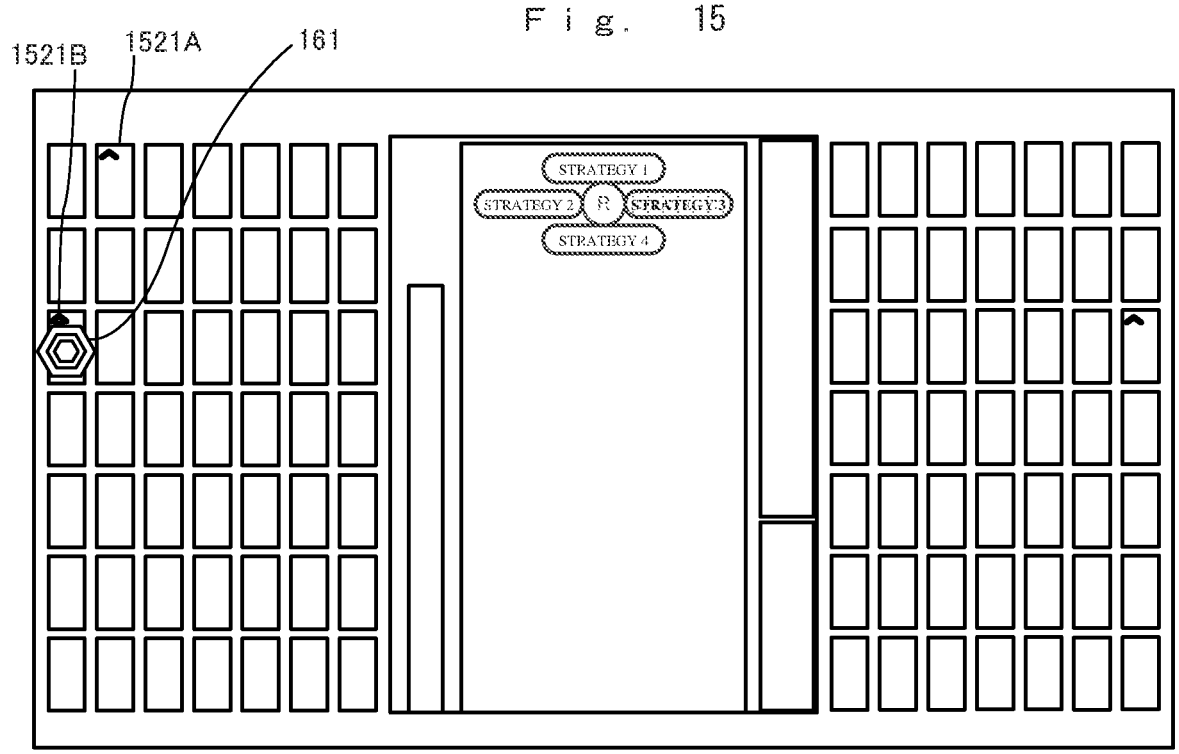
FIG. 15 shows a non-limiting example of the game image according to the exemplary embodiment.

This strategy is a strategy of setting an opponent who possesses the largest number of badges among opponents whose games are not yet over, as a "target". FIG. 15 shows a game image example in the case where the "badge aim" strategy is selected. In FIG. 15, the target image 161 is displayed so as to be superimposed on the opponent image 1521B for the opponent who possesses the largest number of badges at this time. That is, the opponent of the opponent image 1521B is set as a "target". As described above, when the user themselves delivers a finishing blow to the "target", the user can also acquire the badges possessed by the "target". If the user possesses many badges, the "attack power" used when the user sends the obstruction blocks 173 can be increased. Thus, this strategy can be considered as a strategy that is effective when the user desires to positively increase the number of badges.

[Strategy 4: Counter]

Figure 16:
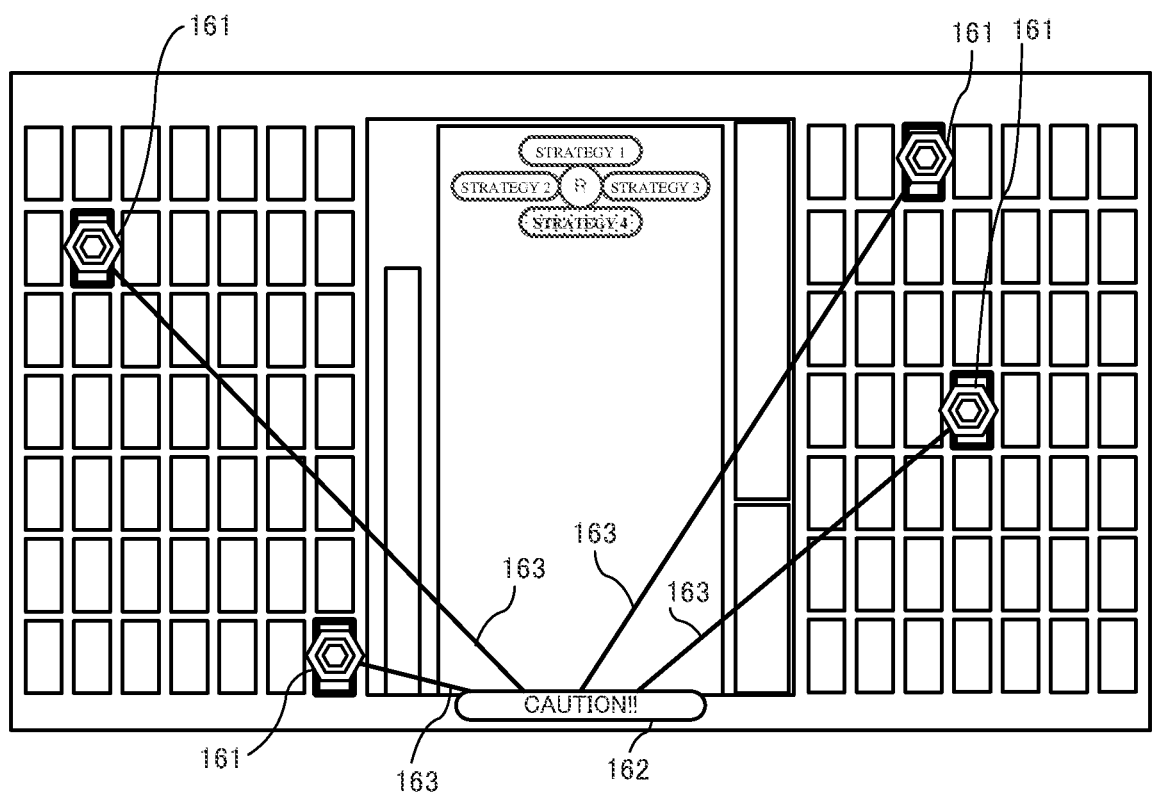
FIG. 16 shows a non-limiting example of the game image according to the exemplary embodiment.

This strategy is a strategy of setting, as a "target", an opponent who sets the user themselves as a "target". If there are a plurality of opponents who set the user themselves as a "target", the plurality of opponents are set as "targets". As described above, in this game, the "target" is one opponent in principle. However, in the "counter" strategy, it is possible to set a plurality of "targets". FIG. 16 shows a game image example in the case where the "counter" strategy is selected. In FIG. 16, the user themselves is set as a "target" by four opponents. By the "counter" strategy, these four opponents are set as "targets", and the target image 161 is displayed so as to be superimposed on each of the opponent images 1521 respectively corresponding to the four opponents. In a state where the "counter" strategy is selected, if the number of opponents who set the user themselves as a "target" changes, opponents who are set as "targets" and the position at which the target images 161 are displayed are changed as appropriate in accordance with the change.

Moreover, when the "counter" strategy is selected, the attack power may be changed in accordance with the number of opponents who set the user themselves as a "target", in addition to the above change of the attack power corresponding to the number of badges. For example, when the number of opponents who set the user themselves as a "target" is larger, the attack power used when sending obstruction blocks to these opponents may be further increased. As an example, the case where the basic attack power is "1" and the number of badges possessed is 0 is assumed. In this case, if the element of the "counter" strategy is not taken into consideration, the final attack power is "1". In such a case, if the "counter" strategy is selected and the number of opponents who set the user themselves as a "target" (=who are set as "targets" by the user themselves) is 1 to 3, for example, "1" is further added to the attack power, so that the final attack power in the "counter" strategy is "2". In addition, if the number of such opponents is 4 to 6, for example, "2" is further added to the attack power, so that the final attack power in the "counter" strategy is "3". Moreover, for example, when the basic attack power is "1" and a value added based on badge is "1", if the number of "targets" in the "counter" strategy is 1 to 3, the final attack power is "3", and, if the number of "targets" in the "counter" strategy is 4 to 6, the final attack power is "4". That is, in addition to the addition of the attack power based on the number of badges possessed, addition of the attack power by the "counter" strategy is made. Accordingly, when the user themselves is targeted by more opponents, the user can increase the attack power and make a counterattack, so that the entertainment characteristics of the game can be enhanced. Particularly, when the number of badges possessed is large, a possibility of the user being targeted by more opponents increases. In this case, when the "counter" strategy is selected, more obstruction blocks can be sent to many opponents at one time, so that the entertainment characteristics of the game can be enhanced without a one-sidedly disadvantageous situation arising.

The "strategies" are not limited to the above. In another embodiment, for example, the following "strategies" may be presented to the user such that the "strategies" are selectable.

[Standout targeting]: Preferentially set, as a "target", an opponent having high frequency of attack against the user themselves.

[One-on-one battle]: Play a one-on-one battle against an opponent who selects "One-on-one battle", until the game of either user becomes over. In this case, the user cannot be attacked by the other opponents.

[Pinpoint targeting]: Fixedly set one randomly selected opponent as a "target". That is, one opponent is fixed as a "target" while this strategy is selected.

[Impregnable guard]: Strategy of, when blocks are deleted, stocking the blocks for use in the above-described "cancellation" without sending the obstruction blocks 173.

In another embodiment, the operation method of setting a target through designation of the "strategy" described above and the operation method of the user directly designating a "target" (for example, the user taps one of the 98 opponent images 1521, or moves a cursor and presses a predetermined button) may be selectively usable. Accordingly, a "target" can be determined semi-automatically through an operation of selecting a "strategy" (policy for determining a "target"), and, additionally, the user can directly determine an opponent as a "target". Thus, regarding determination of a "target", the intention of the user can be more easily reflected.

[What User can do after Game is Over]

Next, a process performed when the game becomes over will be described. In this game, when the game of each user becomes over, the game can be ended and display of the game image can be ended, but it is also possible to "watch" the competition between the opponents. For example, when the game becomes over, an inquiry about whether to watch the competition thereafter is made to the user. If the user chooses to watch the competition in reply to the inquiry, the game image continues to be displayed until the versus game played this time is ended (until the last player is fixed). That is, after the game becomes over, the data indicating the game states of the opponents continues to be acquired from the server 101. In this case, regarding the contents displayed in the first area 151, the contents displayed when the game becomes over is kept displayed, and, regarding the contents displayed in the second area 152, the displayed contents change in accordance with the state of the versus game after the game becomes over. The state of watching after the game becomes over as described above is referred to as "watching mode".

Figure 17:
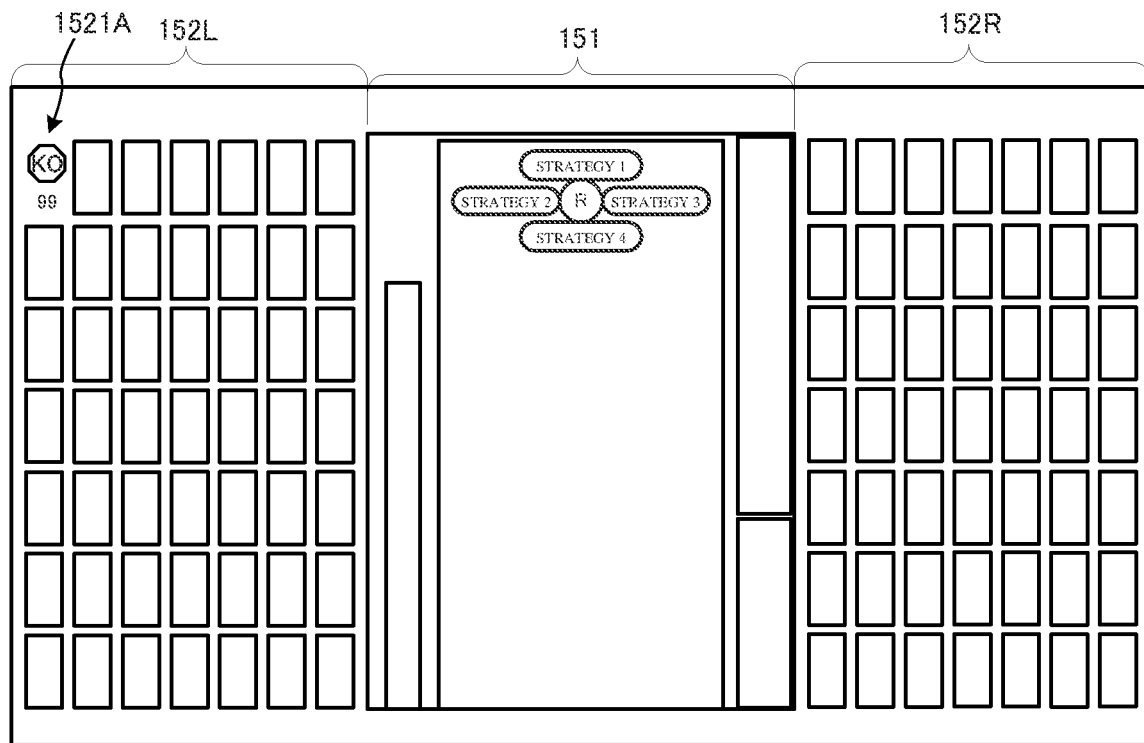
FIG. 17 shows a non-limiting example of the game image according to the exemplary embodiment.

Here, display of the second area 152 after the game of an opponent becomes over will be described with reference to FIGS. 17 and 18. FIG. 17 is a diagram showing a state where the game of the opponent of the opponent image 1521A at the uppermost left side of the second area 152L becomes over for the first time. In FIG. 17, as the opponent image 1521A, an image including characters "KO" (an image indicating that the game is over) is displayed, and a numerical value indicating the ranking is displayed below this image. This drawing indicates that "99th place" is fixed, since the game has become over for the first time in the competition among 99 players.

Figure 18:
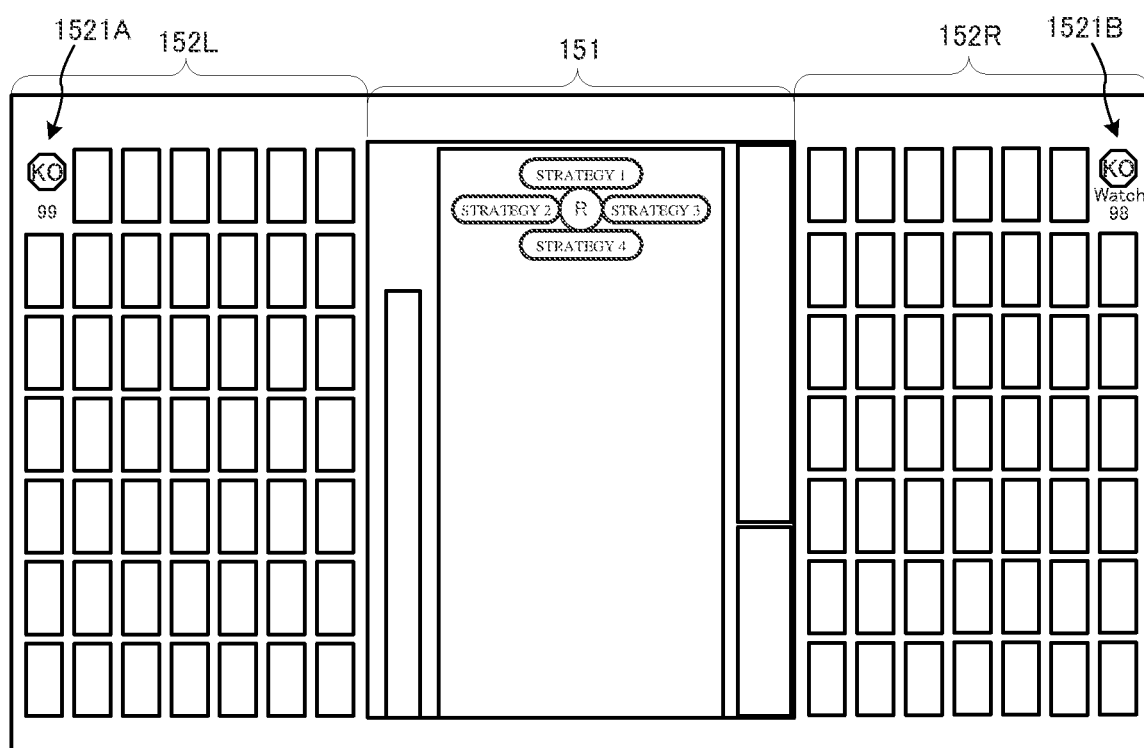
FIG. 18 shows a non-limiting example of the game image according to the exemplary embodiment.

FIG. 18 is a diagram showing a state where the game of the opponent of the opponent image 1521B at the uppermost right side of the second area 152R becomes over for the second time after the state in FIG. 17. Since the game of this opponent has become over for the second time, the "98th place" is fixed as ranking. In addition, in the opponent image 1521B, a character string "Watch" is also displayed between a "KO" image and a value indicating the ranking. The character string "Watch" indicates that the opponent is in the watching mode. That is, the state in FIG. 18 indicates that the opponent of the opponent image 1521A ends the versus game without watching after the game is over, but the opponent of the opponent image 1521B watches after the game is over. As described above, when the game of an opponent becomes over, an image indicating that the game is over, and the ranking are displayed in the second area 152. In addition, if an opponent whose game has been over chooses to watch, display indicating that the opponent chooses to watch is also performed (in the above example, a character string "Watch" is displayed). Accordingly, it can be easily recognized which opponents' games have been over. In addition, it can also be easily recognized how many opponents who are in the watching mode are present.

Figure 19:
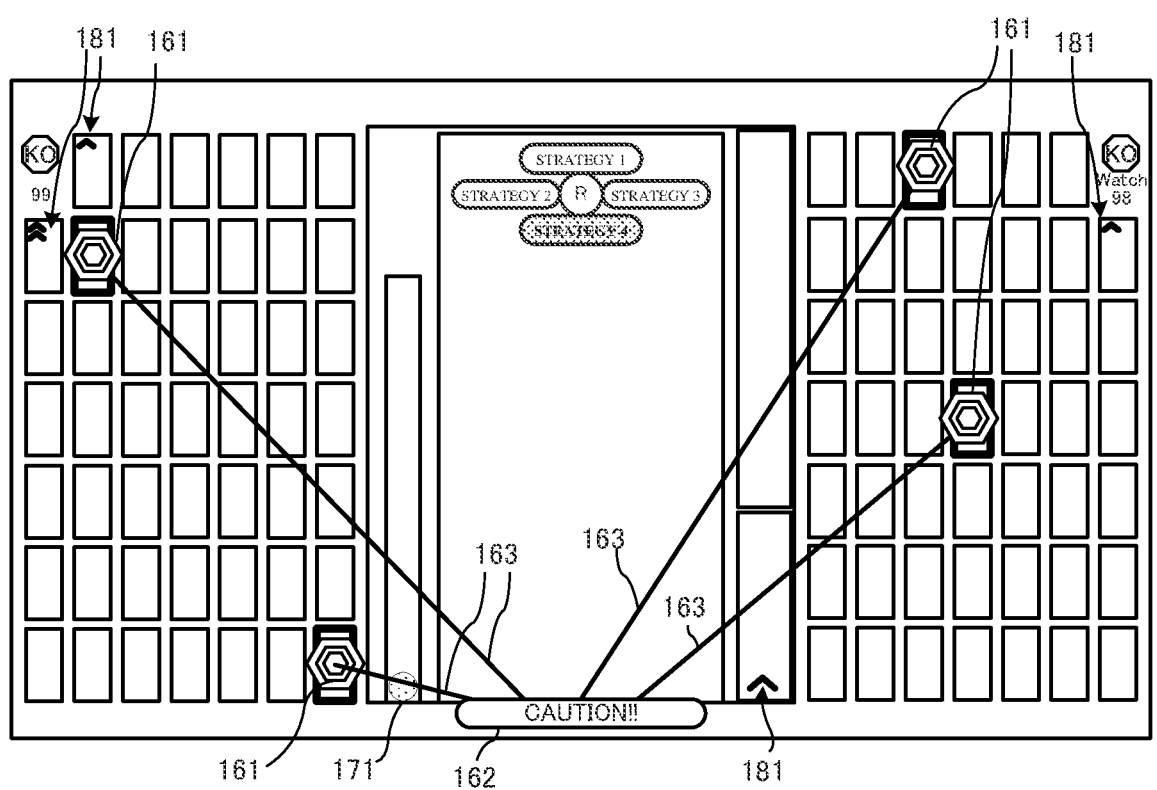
FIG. 19 shows a non-limiting example of the game image according to the exemplary embodiment.

It is needless to say that the respective display elements such as the target images 161, the "CAUTION" panel 162, the straight lines 163, the badge images 181, the wait block images 171, and the "KO" image, which have been described above, can be simultaneously displayed in an actual game image. FIG. 19 shows an example of a game image in which these display elements are simultaneously displayed. In actual game play, the game proceeds while the positions at which the target images 161 and the straight lines 163 are displayed, the number of badge images 181, the number of wait block images 171, etc., change moment by moment in such display.

As described above, in the versus game according to the exemplary embodiment, in order to select a "target" from among as many as 98 opponents, the user is caused to select a strategy, and the processor 81 sets a "target" on the basis of the selected strategy. Accordingly, as to which opponent game state (in this example, the state of the play field 1511)

is to be changed, it is possible to make a decision that more reflects the intention of the user, without interfering with game operations by the user.

[Details of Game Process of Exemplary Embodiment]

Next, the game process in the exemplary embodiment will be described in more detail with reference to FIGS. 20 to 33.

[Data to be Used]

Figure 20:
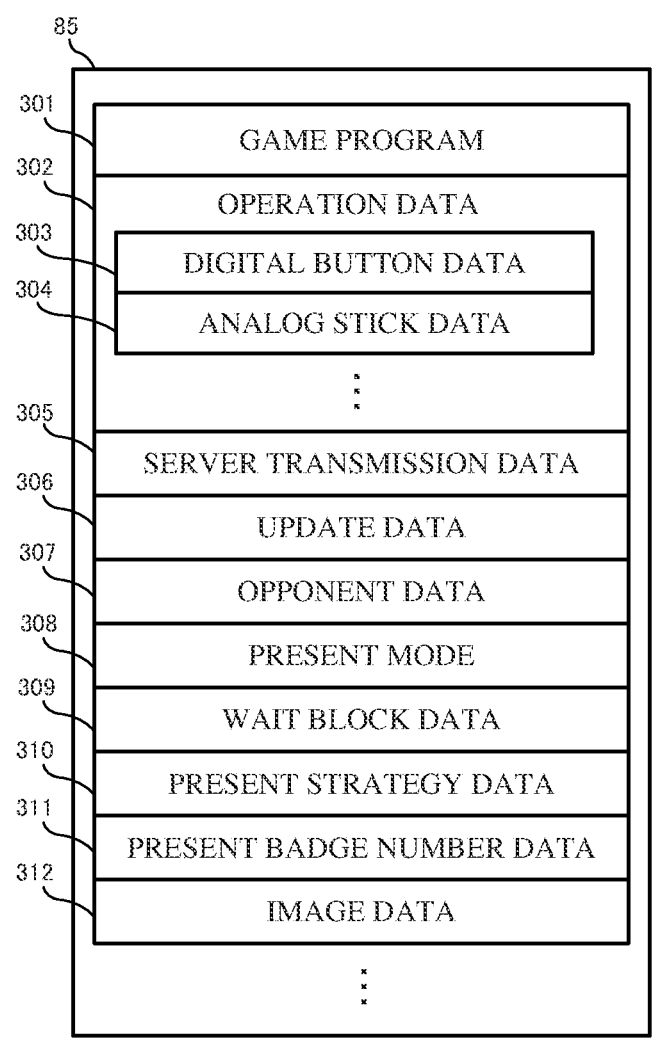
FIG. 20 is a memory map showing a non-limiting example of various kinds of data stored in a storage section 84 of the main body apparatus 2.

First, various kinds of data to be used in the game process will be described. FIG. 20 is a memory map showing an example of various kinds of data stored in the storage section 84 of the main body apparatus 2. In the storage section 84 of the main body apparatus 2, a game program 301, operation data 302, server transmission data 305, update data 306, opponent data 307, a present mode 308, wait block data 309, present strategy data 310, present badge number data 311, image data 312, etc., are stored.

The game program 301 is a program for performing the game process according to the exemplary embodiment.

The operation data 302 is data acquired from the left controller 3 and the right controller 4, and is data indicating the content of an operation by the user. The operation data 302 includes digital button data 303 indicating pressed states of various buttons of each controller, analog stick data 304 indicating the content of an operation on the analog stick, etc.

Figures 21, 24:
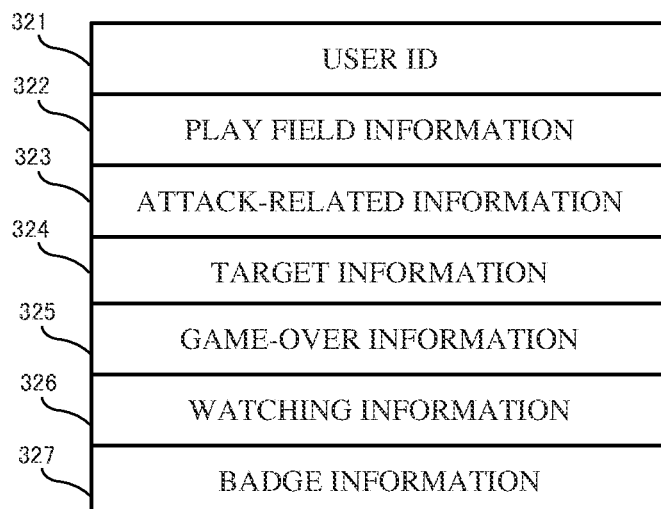
FIG. 21 shows a non-limiting example of the structure of server transmission data 305.
FIG. 24 shows a non-limiting example of the data structure of wait block data 309.

The server transmission data 305 is data to be transmitted from the game system 1 to the server 101. FIG. 21 shows an example of the structure of the server transmission data 305. In FIG. 21, the server transmission data 305 includes a user ID 321, play field information 322, attack-related information 323, target information 324, game-over information 325, watching information 326, badge information 327, etc.

The user ID 321 is information for uniquely identifying 99 users who have participated in this game.

The play field information 322 is data for showing the state of the play field 1511. Specifically, the play field information 322 includes information indicating presence/absence of a block in each of the 20 vertical×10 horizontal cells. In addition, when blocks are present, the play field information 322 also includes information indicating the contents (for example, colors, patterns, shapes, etc.) of the blocks.

The attack-related information 323 is information indicating whether sending of obstruction blocks (attack) to a "target" has occurred. In addition, when sending of obstruction blocks has occurred, the attack-related information 323 also includes information indicating the number of lines in which the obstruction blocks are to be sent (attack power). In other words, the attack-related information 323, together with the later-described target information 324, can be considered as data for instructing the game system 1 of the "target", via the server 101, to cause the obstruction blocks to appear.

The target information 324 is information for specifying the "target".

The game-over information 325 is information indicating whether the game of the user has been over. In addition, when the game becomes over, the game-over information 325 includes information indicating whether the game becomes over due to obstruction blocks from any opponent, and information for specifying the opponent who has caused the game to be over.

The watching information 326 is information indicating whether the user is the watching mode. When the user is in the watching mode, information indicating "during watching" is set in the watching information 326.

The badge information 327 is data indicating the number of badges presently possessed by the user.

Referring back to FIG. 20, the update data 306 is data received from the server 101, and is data for updating the later-described opponent data 307. FIG. 22 shows an example of the data structure of the update data 306. The update data 306 is basically data in a table format in which data having contents similar to those of the server transmission data 305 is one record (one row). That is, the update data 306 can be considered as data that is the server transmission data 305 transmitted from the other 98 opponents except the user themselves and received via the server 101. Specifically, the update data 306 is data in a table format in which a user ID 341, play field information 342, attack-related information 343, target information 344, game-over information 345, watching information 346, badge information 347, etc., which are data similar to the respective data shown in FIG. 21, form one record. The respective data is the same as described in FIG. 21, and thus the description thereof is omitted.

Here, although up to 99 users can participate in the versus game of the exemplary embodiment, it is not always necessary to have 99 users. For example, when there are only 60 participants, a process in which the processor 111 of the server 101 behaves as 39 users is performed. In such a case, in the server 101, for the 39 users (hereinafter, referred to as AI users) which the processor 111 is in charge of, data having contents similar to those of the server transmission data 305 are generated on the basis of action results of the AI users. Then, data including these data is transmitted to each game system 1 and stored as the update data 306 in each game system 1.

Moreover, the update data 306 may include, for example, data indicating tit-for-tat attacks between opponents. That is, the data indicates which opponent attacks which opponent. By using such data, a representation showing a state where opponents attack against each other may be displayed in the second area 152.

Regarding transmission and reception of the update data 306, in another embodiment, the update data 306 is not transmitted and received as data in a table format as described above, and data for each user may be transmitted and received in units of one case (one record in FIG. 22). In consideration of the difference between communication speeds between each game system 1 and the server 101, occurrence of a communication lag, etc., for example, as soon as the server transmission data 305 from each user arrives at the server 101, the server transmission data 305 may be individually transmitted to the game systems 1 of the other users.

Referring back to FIG. 20, the opponent data 307 is an example of data for showing the game state of the game process for each of the 98 opponents except the user themselves, and is data updated as appropriate on the basis of the update data 306. FIG. 23 shows an example of the structure of the opponent data 307. The opponent data 307 includes an image frame number 360 for specifying one of the 98 opponent images 1521 in the second area 152. The opponent data 307 is data in a table format in which a user ID 361, play field information 362, attack-related information 363, target information 364, game-over information 365, watching information 366, and badge information 367 that have contents similar to those of the update data 306 are stored so as to be associated with the image frame number 360. That is, the opponent data 307 can be considered as data that is the server transmission data 305 sent from each opponent and allocated to any of the 98 opponent images 1521 in the second area 152.

Referring back to FIG. 20, the present mode 308 is data indicating whether the user is in the watching mode or whether transition to the watching mode is being inquired (an inquiry screen is displayed). In this example, when transition to the watching mode is being inquired, data indicating "under inquiry" is set, and, when the watching mode has been entered, data indicating "during watching" is set.

The wait block data 309 is data regarding the wait block images 171 to be displayed in the wait block area 1512. FIG. 24 shows an example of the data structure of the wait block data 309. The wait block data 309 includes a wait number 331, an opponent ID 332, attack power 333, and an elapsed time 334. The wait number 331 is a number for identifying each wait block image 171 (that is, each wait block). The opponent ID 332 is information indicating the user ID of an opponent who has sent the wait block. The attack power 333 is information indicating the number of lines in which the obstruction blocks 173 are to appear. The elapsed time 334 indicates a time that elapses after the wait block is sent.

Referring back to FIG. 20, the present strategy data 310 is data indicating the presently selected strategy. The present badge number data 311 is data indicating the number of badges presently possessed by the user. In addition, the image data 312 is data of various images to be displayed in the game process such as images of various blocks and target images.

[Data Stored in Server]

Figure 25:
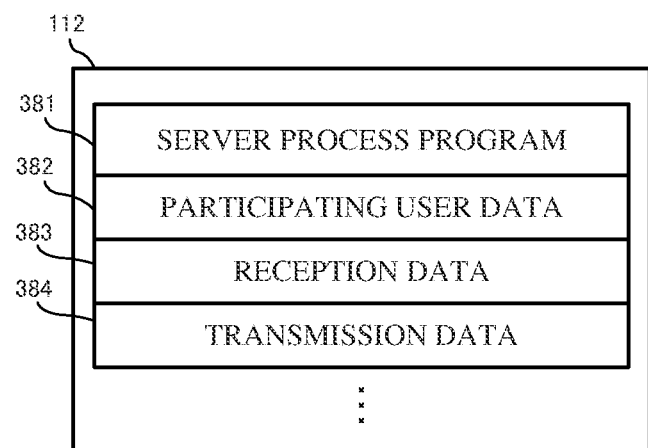
FIG. 25 is a memory map showing a non-limiting example of various kinds of data stored in a storage section 112 of the server 101.

Next, data to be used in the server 101 will be described. FIG. 25 is a memory map showing an example of various kinds of data stored in the storage section 112 of the server 101. In the storage section 112 of the server 101, a server process program 381, participating user data 382, reception data 383, transmission data 384, etc., are stored.

The server process program 381 is a program for performing functions which the server 101 is in charge of, in the game process according to the exemplary embodiment. Mainly, a process of receiving the server transmission data 305 transmitted from each game system 1, a process of progressing the game as each AI user in the case where a process of the AI users is required, a process of generating data to be transmitted to each game system 1, and transmitting the generated data, etc., are performed by this program.

The participating user data 382 is data regarding up to 99 users who have participated in the versus game according to the exemplary embodiment. As for the data structure of the participating user data 382, the participating user data 382 is data in a table format including the contents of the server transmission data 305 of 99 participants in the game. Therefore, the detailed description of the structure of the participating user data 382 is omitted.

The reception data 383 is data that is the temporarily stored server transmission data 305 transmitted from each game system 1. The participating user data 382 is updated on the basis of the reception data 383.

The transmission data 384 is data for transmitting the state of each opponent to each game system 1. In the exemplary embodiment, as for the data structure of the transmission data 384, the transmission data 384 has contents obtained by removing the data of the user of the game system 1 that is the transmission destination, from the contents of the participating user data 382.

[Overall Processing Flow]

Figure 26:
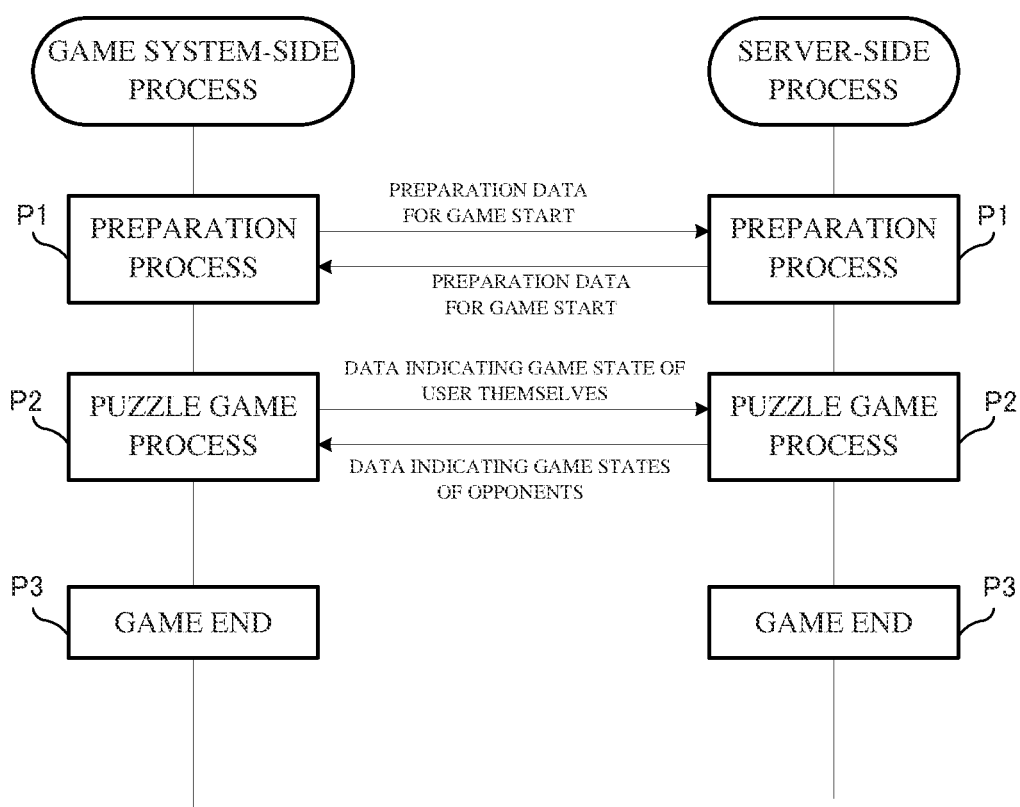
FIG. 26 is a diagram showing overall processing flow in cooperation with the server 101 and each game system 1.

Next, the game process according to the exemplary embodiment will be described in detail. First, the overall processing flow in cooperation with the server 101 and each game system 1 will be described with reference to FIG. 26. In FIG. 26, a game system-side process is shown at the left side, and a server-side process is shown at the right side. First, when start of the versus game is instructed by a certain user, a preparation process P1 is performed between each game system 1 and the server 101. In this process, a deadline time is set, and reception of participation of up to 99 users is performed. Thereafter, when the deadline time has elapsed, if the number of participants is less than 99, AI users, the number of which corresponds to the shortage, are set as appropriate, information about opponents including the AI users is transmitted to each game system, and a process P2 of executing the above-described puzzle game is started. Thereafter, if a user whose game has become over arises, a process of transmitting information indicating the number of badges acquired (hereinafter, acquired badge number data) by this user to a user who has caused the game to be over as described above, is performed as necessary. Furthermore, if the number of users whose games have become over reaches 98, the server 101 transmits information indicating that the final ranking has been fixed, and information indicating the final ranking of each user, the user name, and the like (hereinafter, referred to as end process data) to each game system. Thereafter, a process of display of the final ranking, etc., is performed in each game system, and a process P3 of ending the game (cut-off of a communication session, etc.) is performed, whereby the game according to the exemplary embodiment ends.

[Details of Processes Performed in Game System]

Figure 27:
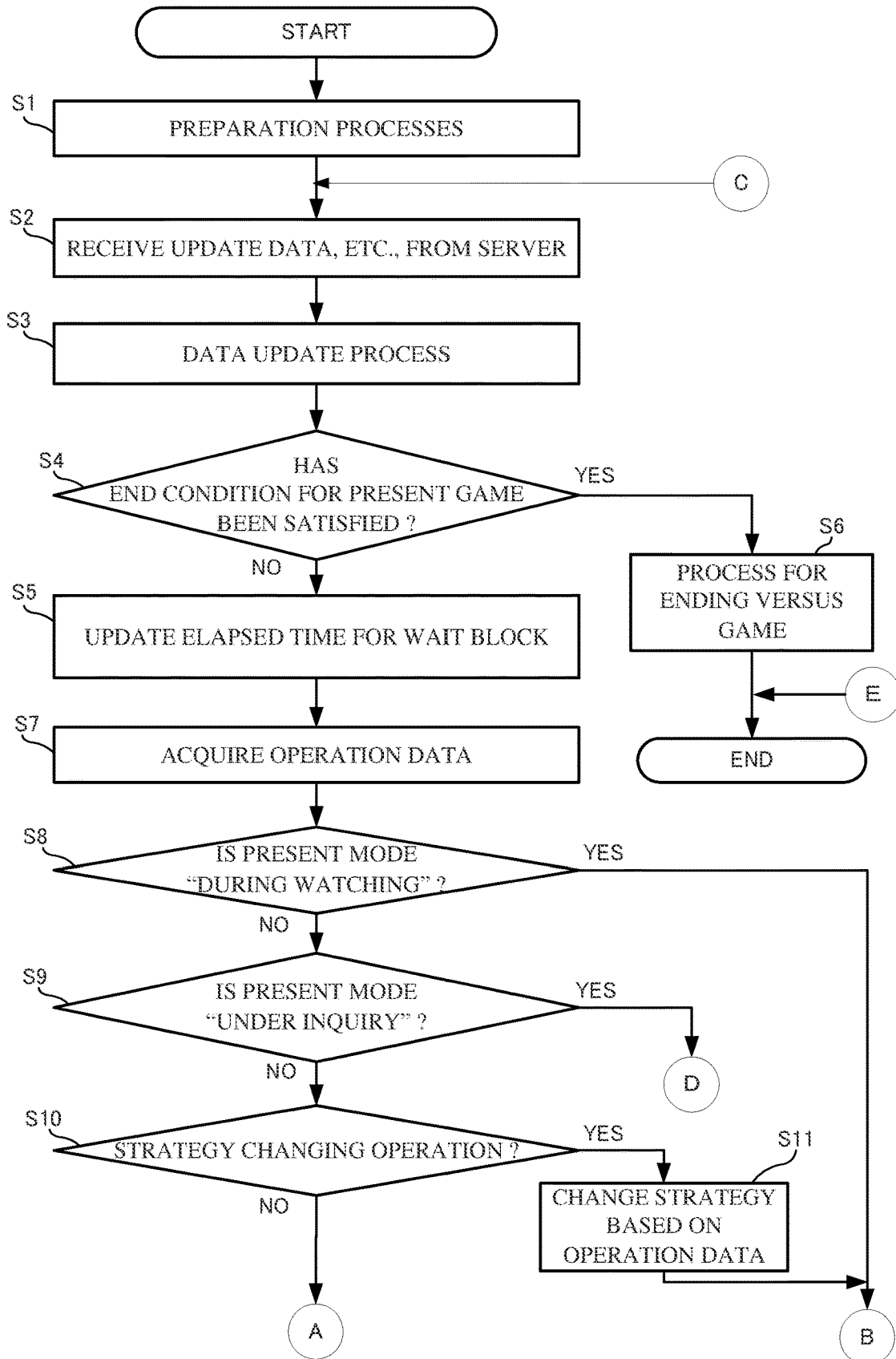
FIG. 27 is a flowchart showing the details of a game process.
Figure 28:
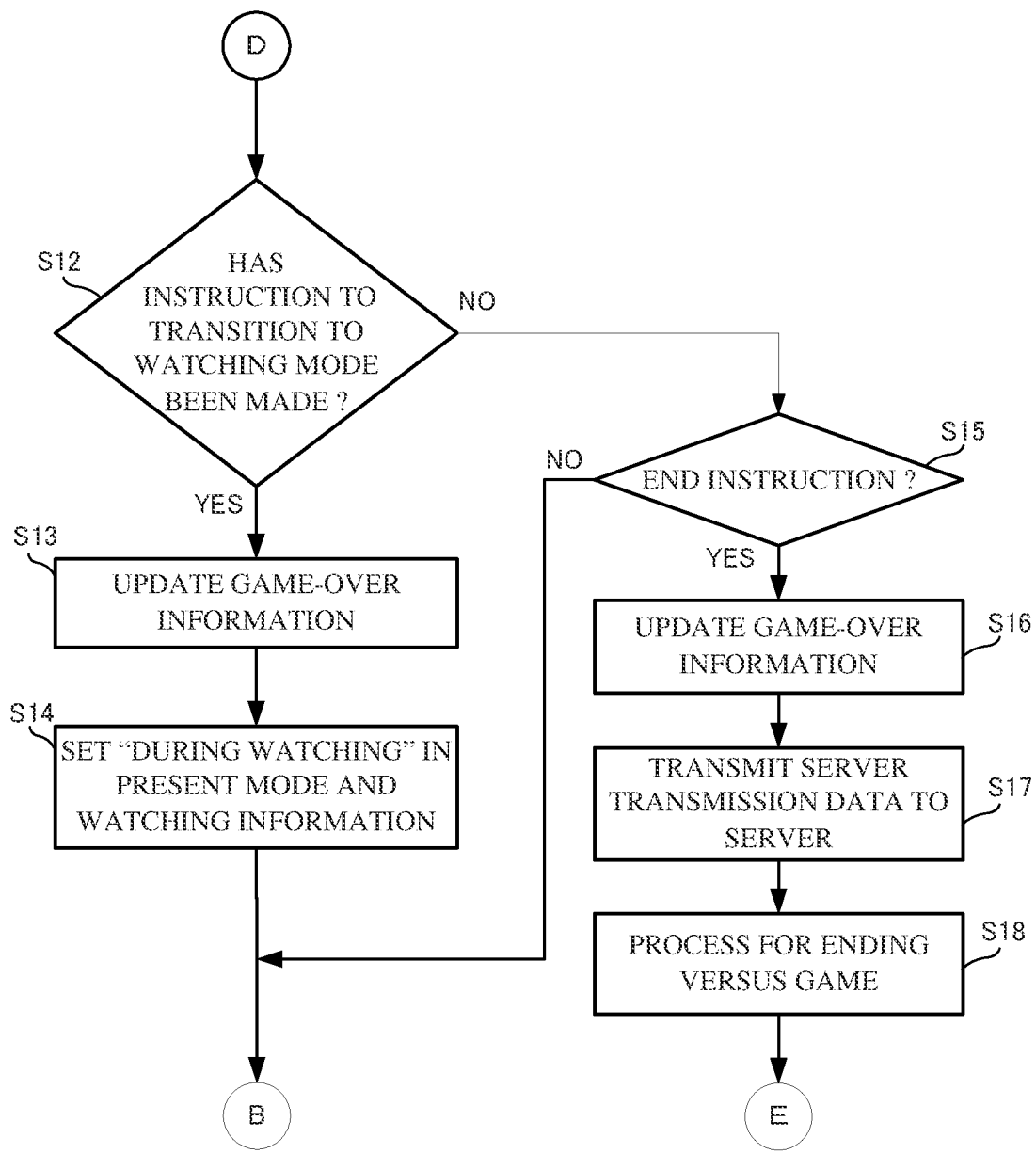
FIG. 28 is a flowchart showing the details of the game process.
Figure 29:
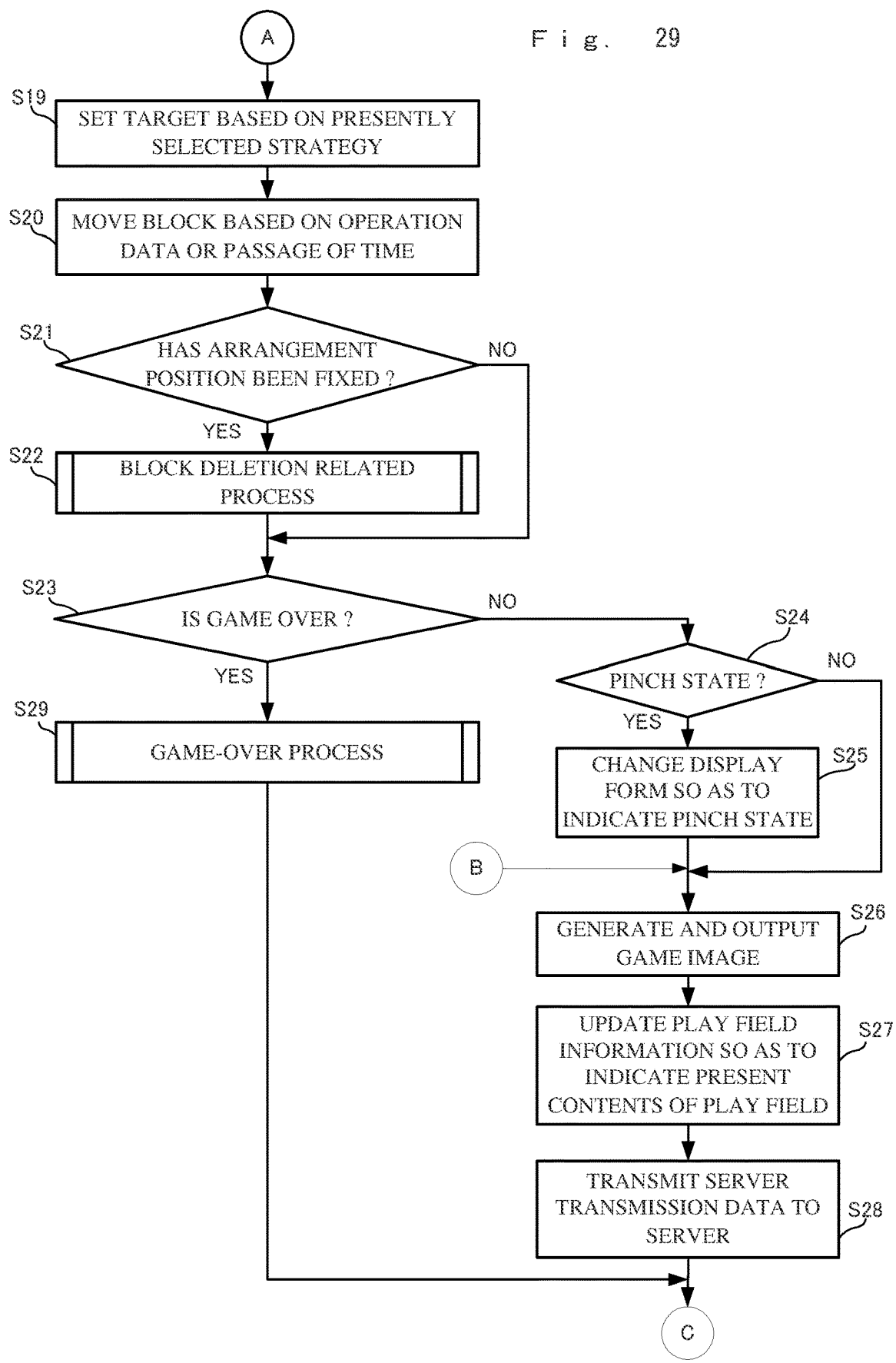
FIG. 29 is a flowchart showing the details of the game process.

Next, the game process performed in each game system 1 will be described in detail. FIGS. 27 to 29 are flowcharts showing the details of the game process. In addition, this process is a process performed after the above deadline time elapses. In addition, the flowcharts shown in these figures are merely examples of the process. Therefore, the order of each process step may be changed as long as the same result is obtained. In addition, the values of variables and thresholds used in determination steps are also merely examples, and other values may be used as necessary.

First, in step S1 in FIG. 27, various preparation processes for starting the game are performed. Specifically, the processor 81 receives the update data 306 including information about each opponent, from the server 101. Then, the processor 81 generates the opponent data 307 on the basis of the update data 306 by allocating each opponent to any of the opponent images 1521 in the second area 152. In addition, although not shown, the processor 81 receives falling order data indicating the order of falling blocks, from the server 101 at this time, and stores the falling order data in the storage section 84. In a puzzle game executed later, the blocks appear in the order based on the falling order data, and the contents displayed in the next block area 1513 are also updated as appropriate. Moreover, the processor 81 sets information indicating "random" as an initial value of the strategy in the present strategy data 310.

Thereafter, an image to be displayed in the second area 152 is generated on the basis of the opponent data 307, and an image to be displayed in the first area 151 is also generated on the basis of the falling order data, etc. Then, a game image including these images is outputted to the display 12. Thereafter, a predetermined count-down representation is performed, and the puzzle game is started. A process loop of steps S2 to S29 described below is repeatedly performed, for example, every frame period.

Next, in step S2, the processor 81 receives the update data 306 from the server 101. In addition, if the acquired badge number data and the end process data are present, the processor 81 receives these data.

Subsequently, in step S3, the processor 81 performs a process of updating various kinds of data. First, the processor 81 updates the opponent data 307 on the basis of the update data 306. Accordingly, the game progress state of each opponent is updated. The opponent data may be updated, for example, at a predetermined interval such as a one-second interval, rather than every frame period. This is because, basically, the puzzle game can proceed independently in each game system 1, so that it is not necessary to synchronize with the other game systems 1 so strictly (in this game, even if there is a slight time lag in communication, the influence of the time lag is considered to be small). In addition, the contents of the wait block data 309 are also updated as appropriate on the basis of the attack-related information 363 of the updated opponent data 307. That is, a process of reflecting an attack received from an opponent is also performed.

Furthermore, if the acquired badge number data has been received in step S2, predetermined values are added to the present badge number data 311 and the badge information 327 on the basis of the acquired badge number data, so that these data are updated. As described above, if the game of a "target" is caused to be over by obstruction blocks sent by the user themselves, the acquired badge number data is transmitted from the server 101, and a predetermined number of badges can be acquired.

Next, in step S4, the processor 81 determines whether an end condition for the present versus game has been satisfied. Specifically, it is determined whether the end process data has been received from the server 101 in step S2 described above. As a result, if the end condition has been satisfied (YES in step S4), the processor 81 performs a process for ending the present versus game in step S6. Specifically, the processor 81 performs a process of, for example, displaying the final ranking of each user, on the basis of the end process data received from the server 101. Thereafter, the processor 81 performs a process for cutting off communication with the server 101, and the game process ends.

On the other hand, as a result of the determination in step S4 described above, if the end condition has not been satisfied (NO in step S4), in step S5, the processor 81 refers to the wait block data 309 and updates the elapsed time 334 for the wait block that is present at that time. For example, a process of counting up the elapsed time 334 is performed.

Next, in step S7, the processor 81 acquires the operation data 302. Next, in step S8, the processor 81 determines whether the present mode 308 is "during watching". That is, the processor 81 determines whether (the game of the user is already over and) the user has been in the watching mode. As a result of the determination, if the present mode 308 is "during watching" (YES in step S8), the processor 81 advances the processing to step S26 described later.

On the other hand, if the present mode 308 is not "during watching" (NO in step S8), the processor 81 subsequently determines in step S9 whether the present mode 308 is "under inquiry". If the present mode 308 is "under inquiry", the processor 81 determines in step S12 in FIG. 28 whether the operation content indicated by the operation data 302 is a transition instruction to transition to the watching mode. As a result, if the transition instruction has been made (YES in step S12), in step S13, the processor 81 updates the game-over information 325 such that the game-over information 325 includes information indicating that the game of the user has been over. Furthermore, in step S14, the processor 81 sets information indicating "during watching", in the present mode 308 and the watching information 326 of the server transmission data 305. Thereafter, the processor 81 advances the processing to step S26 described later.

On the other hand, as a result of the determination in step S12, if the transition instruction has not been made (NO in step S12), the processor 81 determines in step S15 whether the operation content indicated by the operation data 302 is an instruction to end the game. That is, it is determined whether ending the game without watching has been selected by the user after the game becomes over. If the operation content indicated by the operation data 302 is an instruction to end the game (YES in step S15), in step S16, the processor 81 updates the game-over information 325 such that the game-over information 325 includes information indicating that the game of the user has been over. Subsequently, in step S17, the processor 81 performs a process of transmitting the server transmission data 305 to the server 101. Thereafter, in step S18, the processor 81 performs a process for ending the game. Unlike the process in step S6 described above, here, display of the final ranking, etc., are not performed, and the game process is ended (that is, a process of leaving the game halfway is performed). In addition, by the transmission process in step S17 described above, a notification indicating that the game of the user has been over and the user will not watch thereafter is sent to the server 101 (and the other opponents).

Referring back to FIG. 27, as a result of the determination in step S9 described above, if the present mode 308 is not "under inquiry" (NO in step S9), the processor 81 determines in step S10 whether the operation content indicated by the operation data 302 is an operation for changing the strategy as described above (in this example, an operation on the analog stick of the right controller 4). As a result of the determination, if the operation for changing the strategy has been performed (YES in step S10), the content of the present strategy data 310 is updated on the basis of the operation content indicated by the operation data 302. Thereafter, the processor 81 advances the processing to step S26 described later.

On the other hand, as a result of the determination in step S10, if the operation for changing the strategy has not been performed (NO in step S10), subsequently, in step S19 in FIG. 29, the processor 81 performs a process of referring to the present strategy data 310 and selecting the "target" on the basis of the presently selected strategy. Specifically, the following process is performed by the processor 81. First, if the present strategy is "finishing blow aim", the processor 81 refers to the opponent data 307, and extracts any opponent who is in the "pinch state" as described above, on the basis of the play field information 362 of each opponent. As a result of the extraction, if there is only one opponent in the "pinch state", the processor 81 sets the user ID 361 indicating this opponent, in the target information 324 to set this opponent as a "target". In addition, if there are a plurality of opponents in the "pinch state", the processor 81 determines one opponent out of these opponents as a "target" (the method for the determination may be any method), and sets the user ID 361 indicating the one opponent, in the target information 324. Moreover, if the present strategy is "random", the processor 81 randomly selects one opponent from among the opponents, and sets the user ID 361 indicating the selected opponent, in the target information 324. Furthermore, if the present strategy is "badge aim", the processor 81 refers to the opponent data 307, selects a certain opponent on the basis of the badge information 367 of each opponent, and sets the user ID 361 indicating the selected opponent, in the target information 324. Furthermore, if the present strategy is "counter", the processor 81 refers to the opponent data 307, and specifies an opponent who sets the user themselves as a "target", on the basis of the target information 364. Then, the processor 81 sets the user ID 361 of the specified opponent (if a plurality of such opponents are present, the user IDs 361 of all the opponents) in the target information 324 of the server transmission data 305.

Next, in step S20, the processor 81 moves the block within the play field 1511 on the basis of the operation data 302 or on the basis of the passage of time. If the operation content indicated by the operation data 302 is an operation for moving the block leftward, rightward, or downward, or rotating the block, the processor 81 moves or rotates the block in accordance with the operation content. In addition, even if an operation for the block has not been performed by the user, a process of moving the block downward by one cell is also performed each time a predetermined time elapses.

Next, in step S21, the processor 81 determines whether the position at which the block is arranged has been fixed. If the position at which the block is disposed has not been fixed (NO in step S21), the processor 81 advances the processing to step S23 described later. If the position at which the block is arranged has been fixed (YES in step S21), the processor 81 performs a block deletion related process in step S22.

Figure 30:
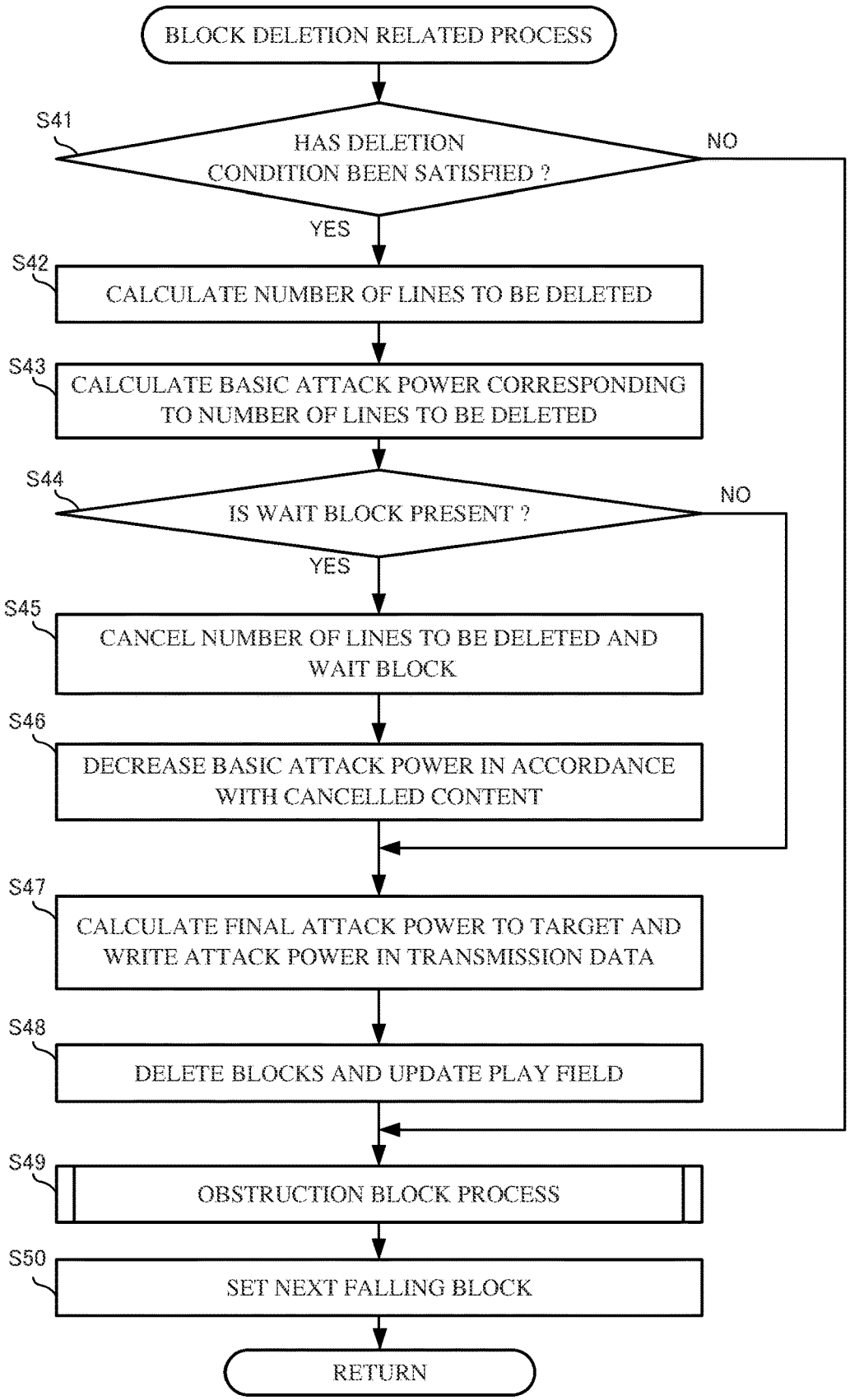
FIG. 30 is a flowchart showing the details of a block deletion related process.

FIG. 30 is a flowchart showing the details of the block deletion related process. First, in step S41, the processor 81 determines whether a deletion condition for blocks has been satisfied as a result of the arrangement of the block being fixed. In the exemplary embodiment, it is determined whether there are blocks filling one horizontal line in the play field 1511. As a result of the determination, if the deletion condition has not been satisfied (NO in step S41), the processor 81 proceeds to a process in step S49 described later. On the other hand, if the deletion condition has been satisfied (YES in step S41), subsequently, in step S42, the processor 81 calculates the number of lines in which blocks are to be deleted. That is, how many lines are to be deleted is calculated.

Next, in step S43, the basic attack power is calculated on the basis of the number of lines to be deleted. In this example, the number of lines to be deleted and the value of the basic attack power are made equal to each other. For example, if the number of lines to be deleted is 1, the basic attack power is 1, and, if the number of lines to be deleted is 3, the basic attack power is 3.

Next, in step S44, the processor 81 refers to the wait block data 309 and determines whether any wait block presently exists. If no wait block exists (NO in step S44), the processor 81 advances the processing to step S47 described later. If any wait block exists (YES in step S44), a process of cancelling the number of lines to be deleted and the wait block is subsequently performed in step S45. For example, if two lines can be deleted in a state where three wait block images 171 exist, 2 is subtracted from the attack power 333 of the wait block data 309. Accordingly, a process for reducing the wait block images 171 displayed in the screen is also performed. In addition, as a result of the subtraction, if the attack power becomes equal to or less than 0, a process of deleting a record for the wait block that makes the attack power to be 0, from the wait block data 309, is also performed. Moreover, for example, the case where a wait block for which the wait number 331 is "1" in the wait block data 309 and a wait block for which the wait number 331 is "2" in the wait block data 309 are present, is assumed. It is also assumed that the attack power for the wait block for which the wait number 331 is "1" is "1", and the attack power for the wait block for which the wait number 331 is "2" is "3". In this case, when two lines are deleted, the wait block for which the wait number 331 is "1" is completely cancelled, and one line is cancelled for the wait block for which the wait number 331 is "2" (the attack power 333 is decreased to 2). That is, the wait blocks are canceled in the order from a wait block having a smaller wait number 331.

Next, in step S46, the processor 81 decreases the basic attack power in accordance with the cancelled content. For example, if cancellation of one line has been performed, "1" is subtracted from the basic attack power.

Next, in step S47, the processor 81 corrects the basic attack power on the basis of the number of badges possessed by the user that is indicated by the badge information 327. Furthermore, when the presently selected strategy is "counter", the processor 81 corrects the basic attack power on the basis of the number of opponents who set the user themselves as a "target". For example, when the number of badges possessed is 1, 1 is added to the basic attack power. Moreover, when the strategy is "counter" and the user themselves is set as a "target" by three opponents (this can be recognized on the basis of the opponent data 307), 1 is further added to the basic attack power in addition to the addition based on badge. As an example, "basic attack power+correction attack power based on number of badges+ correction attack power based on "counter" strategy" is calculated as final attack power to a "target". Then, the processor 81 sets the attack power calculated in this manner, together with information indicating that an attack against the "target" has occurred, in the attack-related information 323 of the server transmission data 305.

Next, in step S48, the processor 81 performs a process of updating the contents of the play field 1511 with the deletion of the blocks. That is, a process of updating the arrangement of the blocks after the deletion is performed.

Figure 31:
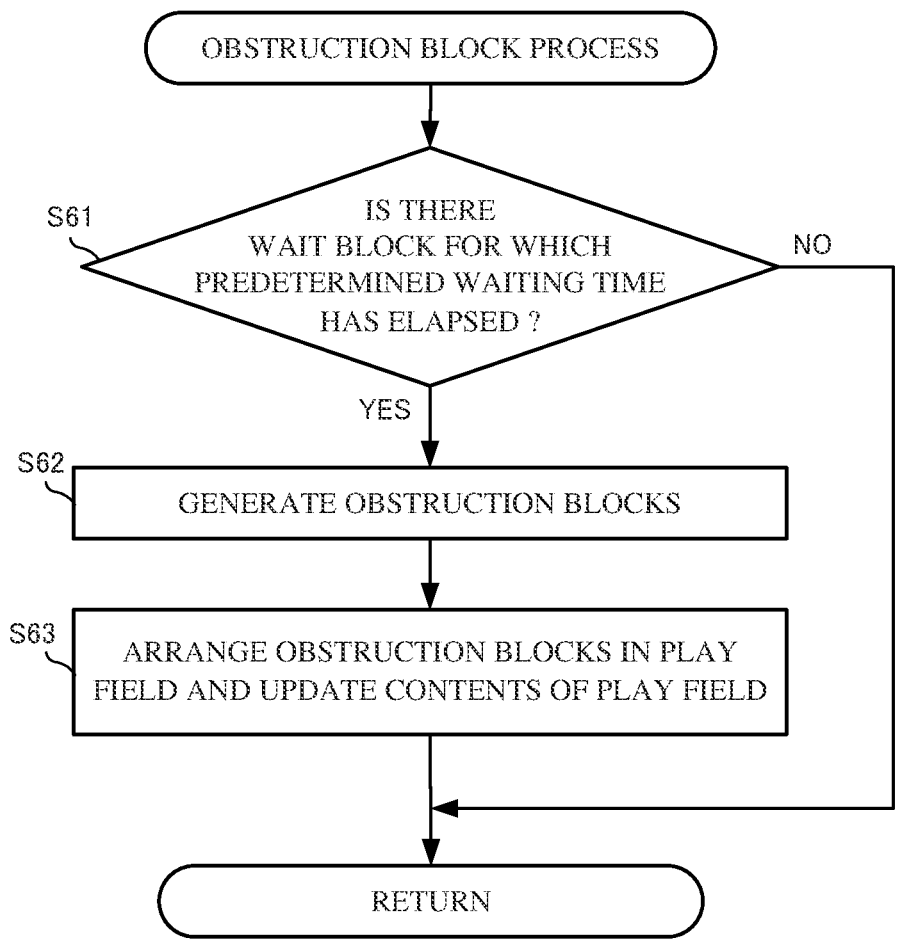
FIG. 31 is a flowchart showing the details of an obstruction block process.

Next, in step S49, the processor 81 performs an obstruction block process. FIG. 31 is a flowchart showing the details of the obstruction block process. In FIG. 31, first, in step S61, the processor 81 refers to the wait block data 309 and determines whether there is any wait block for which the elapsed time 334 exceeds a preset certain waiting time. As a result of the determination, if there is no such wait block (NO in step S61), the obstruction block process ends. On the other hand, if there is such a wait block (YES in step S61), the processor 81 subsequently generates the obstruction blocks 173 in step S62. Specifically, the processor 81 determines the number of lines in which the obstruction blocks 173 are to be caused to appear, on the basis of the attack power 333 of the wait block data 309. Then, the processor 81 determines the contents of the obstruction blocks 173 for each of the lines. In this example, as described above with reference to FIG. 10, blocks for 9 cells except one cell made empty in one horizontal line are generated as the obstruction blocks 173.

Next, in step S63, the processor 81 performs a process of arranging the generated obstruction blocks 173 in the play field 1511 and updating the contents of the play field 1511 after the arrangement. In this example, the obstruction blocks 173 are arranged so as to rise from the lower side. In addition, a process of deleting the wait block corresponding to the obstruction blocks 173 caused to appear, from the wait block data 309, is also performed. Moreover, accordingly, a process of deleting the corresponding wait block image 171 from the wait block area 1512 is also performed. Then, the obstruction block process ends.

Referring back to FIG. 30, subsequently, in step S50, the processor 81 performs a process for displaying a block falling next, on the basis of the falling order data. In addition, the processor 81 also performs a process of updating the contents displayed in the next block area 1513. Then, the block deletion related process ends.

Referring back to FIG. 29, subsequently, in step S23, the processor 81 determines whether the state of the play field 1511 satisfies a condition for causing the game to be over. In this example, if blocks have been stacked up to the uppermost stage of the play field, it is determined that the condition for causing the game to be over is satisfied. As a result of the determination, if the game is not over (NO in step S23), the processor 81 determines in step S24 whether the state of the play field 1511 is the above "pinch state". As a result, if the state of the play field 1511 is not the "pinch state" (NO in step S24), the processor 81 advances the processing to step S26. On the other hand, if the state of the play field 1511 is the "pinch state" (YES in step S24), the processor 81 changes the display form of the play field 1511 to a display form indicating that the state of the play field 1511 is the "pinch state", in step S25.

Subsequently, in step S26, the processor 81 generates a game image that reflects the contents of the above processes, and outputs the game image to the display 12. Specifically, the processor 81 generates images to be displayed in the second area 152, that is, a total of 98 opponent images 1521, on the basis of the play field information 362 of the opponent data 307. In addition, the processor 81 superimposes the target image 161 on the opponent image 1521 for an opponent who is targeted by the user themselves, on the basis of the target information 324. Moreover, on the basis of the target information 364 of the opponent data 307, the processor 81 arranges the "CAUTION" panel 162 at the lower portion of the play field 1511 and further generates and arranges the straight line 163 connecting the "CAUTION" panel 162 to the opponent image 1521 for an opponent who is targeting the user themselves. Furthermore, the processor 81 also determines contents to be displayed in the wait block area 1512, the badge display area 1514, and the strategy operation panel 1515, on the basis of the wait block data 309, the present strategy data 310, and the present badge number data 311. Moreover, the processor 81 refers to the game-over information 365 and determines whether the games of the respective opponents have been over. If the game of an opponent has been over, the processor 81 further determines whether the opponent is in the watching mode, on the basis of watching information 366. Then, on the basis of the result of the determination, the processor 81 generates an image indicating that the game has been over and indicating whether the opponent is watching (see FIGS. 17 and 18 described above) as the opponent image 1521. Accordingly, the states of the games of the 98 opponents can be presented to the user. Furthermore, as an image to be displayed in the first area 151, the processor 81 also generates an image that reflects various processes related to the play field 1511 described above. If the game of the user has been over and the user has been in the watching mode, further update of the contents of the play field 1511 is not performed, and thus an image indicating the state of the play field 1511 when the game is over is generated. Then, a game image to be outputted is generated by combining these images and is outputted to the display 12.

Subsequently, in step S27, the processor 81 performs a process of updating the content of the play field information 322 of the server transmission data 305 such that the state of the play field 1511 after the above process is reflected is indicated. After the game of the user becomes over (when the present mode 308 is "under inquiry" or "during watching"), update of the play field information 322 is not performed.

Next, in step S28, the processor 81 performs a process of transmitting the server transmission data 305 to the server 101. Then, the processor 81 returns to step S2 described above, and the process is repeated.

Figure 32:
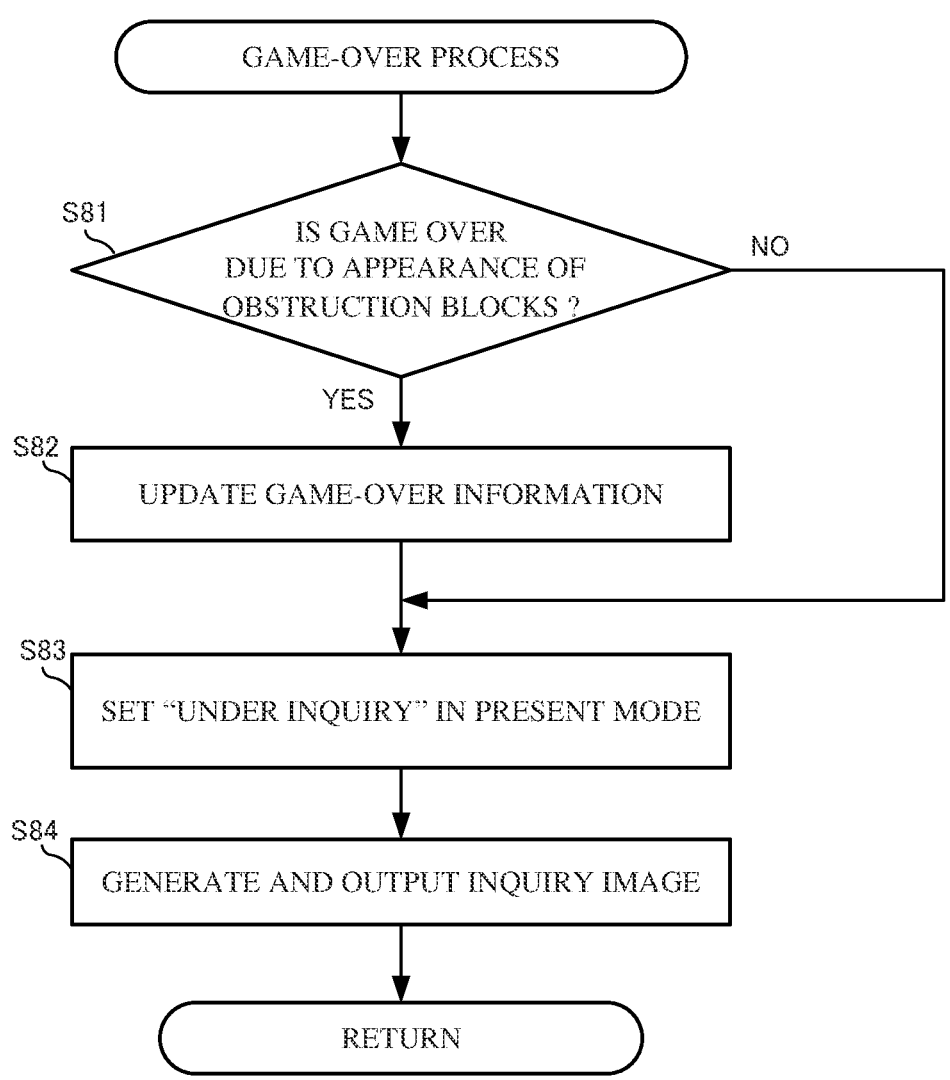
FIG. 32 is a flowchart showing the details of a game-over process.

On the other hand, as a result of the determination in step S23 described above, if the game is over (YES in step S23), a game-over process is performed in step S29. FIG. 32 is a flowchart showing the details of the game-over process. First, in step S81, the processor 81 determines whether the game is over this time due to appearance of the obstruction blocks 173. As result, if the game is over this time not due to appearance of the obstruction blocks 173 (NO in step S81), the processor 81 advances the processing to step S83. On the other hand, if the game is over this time due to appearance of the obstruction blocks 173 (YES in step S81), the processor 81 updates the game-over information 325 in step S82. Specifically, the processor 81 performs a process of setting information for causing the opponent who has sent the obstruction blocks 173, to acquire a badge, in the game-over information 325. That is, the game-over information 325 is set such that the game-over information 325 includes the user ID of the opponent who has sent the obstruction blocks 173 and information indicating the number of badges possessed by the user at that time. Accordingly, the badges possessed by the user at that time can be given to the opponent indicated here.

Next, in step S83, the processor 81 sets "under inquiry" in the present mode 308. Next, in step S84, the processor 81 generates an inquiry image that inquires of the user about whether to watch, and outputs the inquiry image to the display 12. Accordingly, the game-over process ends. After the game-over process ends, the processor 81 returns to step S2 described above, and the process is repeated.

This is the end of the detailed description of the game process performed in each game system 1.

[Details of Process at Server Side]

Figure 33:
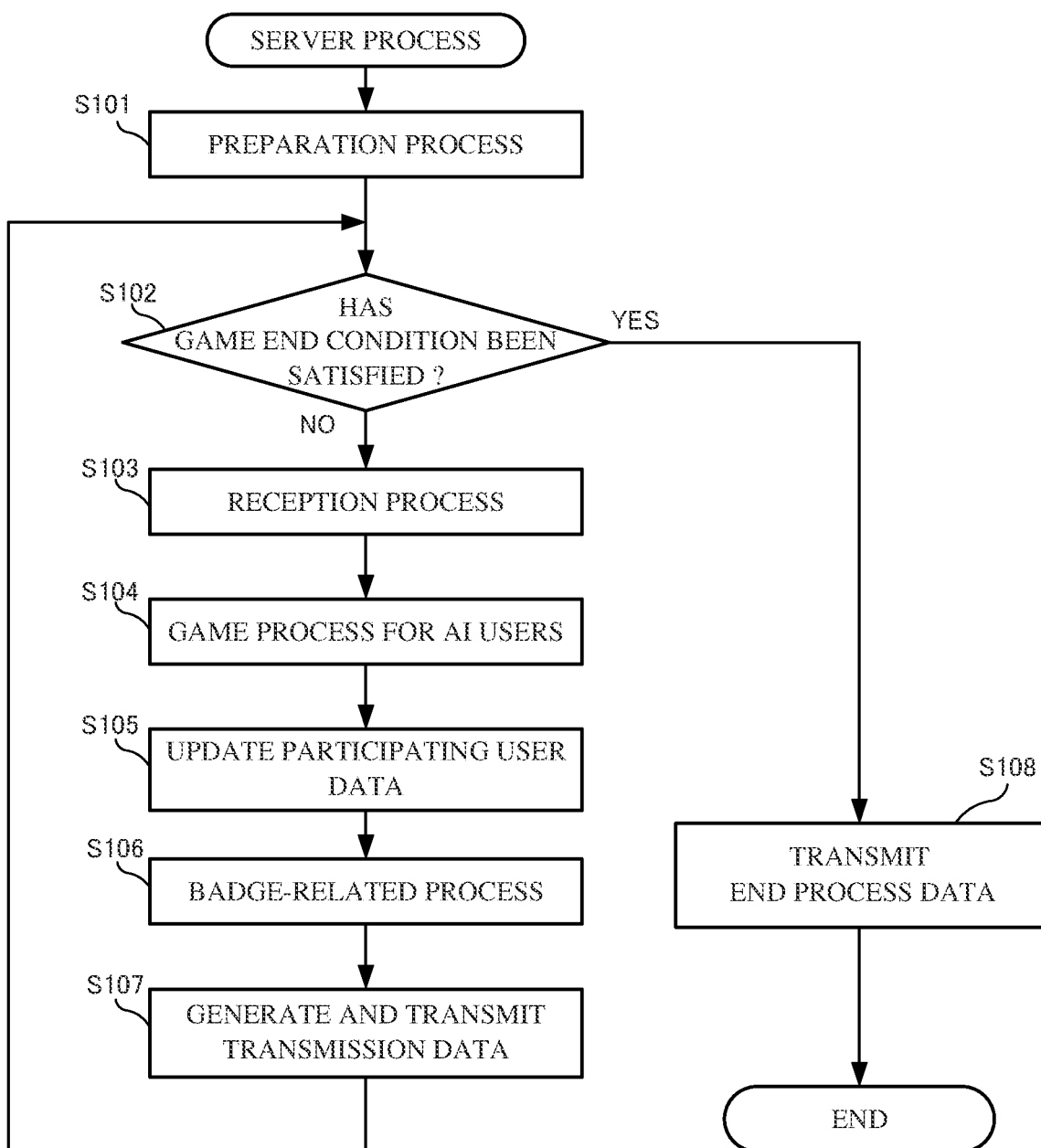
FIG. 33 is a flowchart showing the details of a server process.

Next, a process performed in the server 101 will be described in detail. FIG. 33 is a flowchart showing the details of a server process performed by the processor 111 of the server 101. First, in step S101, the processor 111 performs a preparation process. Specifically, the processor 111 generates the participating user data 382 on the basis of data transmitted from each game system 1 that participates in the game. At this time, if the number of the participants is less than 99, the processor 111 is in charge of users for the shortage as AI users. Therefore, the processor 111 also generates data regarding the AI users such that the data is included in the participating user data 382. Thereafter, when it becomes ready to start the versus game, the processor 11 transmits information indicating start of the versus game, to each game system 1.

Next, in step S102, the processor 111 refers to the participating user data 382 and determines whether a game end condition has been satisfied. For example, the processor 111 determines whether the number of users whose games have been over has reached 98. As a result of the determination, if the end condition has not been satisfied (NO in step S102), the processor 111 performs a reception process, that is, the processor 111 receives the server transmission data 305 transmitted from each game system 1, in step S103.

Next, in step S104, the processor 111 performs a puzzle game process related to the AI users. If no AI user is unnecessary, this process is not performed.

Next, in step S105, the processor 111 updates the participating user data 382 on the basis of the received data and the result of the puzzle game process for the AI users.

Next, in step S106, the processor 111 performs a process regarding acquiring the badge when the game is over. That is, the processor 111 performs a process of causing a predetermined user to acquire the badge, on the basis of the game-over information included in the participating user data 382. For example, when the game of a user A has become over due to obstruction blocks sent from a user B, information indicating that the game of the user A has become over due to the obstruction blocks sent from the user B is included in the game-over information 325 transmitted from the user A. On the basis of this information, the processor 111 determines to cause the user B to acquire one badge. Furthermore, the processor 111 refers to the badge information 327 of the user A, and, if the user A possesses one or more badges, the processor 111 further adds the number of the badges possessed, and determines to cause the user B to acquire the added badges. Then, the processor 111 generates information indicating the number of badges which the user B is to be caused to acquire, as the acquired badge number data the destination of which is set to the user B.

Next, in step S107, the processor 111 generates transmission data to be transmitted to each game system 1. Specifically, the processor 111 generates, as transmission data, data related to the users other than the user of the game system 1 that is the transmission destination. For example, as transmission data to a user A, transmission data including the 98 users except the user A is generated. In addition, if the acquired badge number data has been generated, this data is included in transmission data to the corresponding user. Then, the processor 111 transmits the transmission data to each game system 1 that has participated in the game. At this time, the processor 111 may not transmit such transmission data to the game system 1 of the user whose game has been over and who has chosen not to watch. After this process, the processor 111 returns to step S102 described above, and the process is repeated.

On the other hand, as a result of the determination in step S102 described above, if the game end condition has been satisfied (YES in step S102), the processor 111 generates the end process data including information such as final ranking and transmits the end process data to each game system 1, in step S108. At this time as well, the processor 111 may not transmit the end process data to the game system 1 of the user whose game has been over and who has chosen not to watch.

This is the end of the description of the process at the server side.

As described above, in the exemplary embodiment, as for selection of an attack target in the versus game in which as many as 98 opponents are present, by causing the user to select the "strategy" described above, an easy selection operation is enabled while the intention of the user is reflected. Accordingly, in the game in which the user competes with many opponents, the ease of selection in the game in which it is necessary to designate an opponent, for example, by setting the opponent as an attack target can be further improved.

Moreover, images respectively corresponding to the many opponents described above are also displayed, and the target images 161, the "CAUTION" panel 162, and the straight lines 163 are displayed. Accordingly, who the user themselves has selected or who has selected the user themselves can be more clearly presented.

[Modifications]

In the embodiment described above, as for display of the ranking of each user, the case of displaying the ranking of the user when the game of the user becomes over and the ranking of the user is fixed, is shown. In another embodiment, the ranking may be displayed in real time. For example, in the case of determining the ranking on the basis of the number of "badges" possessed in the versus game described above, the ranking at that time may be displayed so as to be superimposed on the opponent image 1521 in accordance with the number of badges possessed by each user. Then, the display of the ranking may be changed in real time in accordance with a change in the number of badges possessed.

In the embodiment described above, the target image 161 is displayed so as to be superimposed on the opponent image 1521 for the opponent who is set as a "target". In another embodiment, instead of displaying the target image 161, the display form of the opponent image 1521 itself may be changed. For example, the opponent image 1521 may be displayed such that the size thereof is slightly increased, or a predetermined animation representation may be performed on the opponent image 1521.

Moreover, as an example of the method for changing the game state of each opponent, the example of interfering with progress of the puzzle game of the opponent by sending the "obstruction blocks" to the opponent has been described above, but the method for changing the game state of each opponent is not limited thereto. In another embodiment, for example, any method other than the method using the "obstruction blocks" may be used, as long as the method includes a content that interferes with progress of the game of the opponent, such as decreasing the durability of the opponent such as the physical strength/HP of the opponent, decreasing an allocated time of the opponent, and temporarily preventing reception of a game operation performed by the opponent.

As for display in the second area 152, in the embodiment described above, an image of "KO" shown in FIG. 17 described above or the like is displayed as display of an opponent whose game has been over. That is, when the game of the opponent becomes over, the display of the opponent is changed. As for this point, in another embodiment, a process using the element of a so-called bingo game may be performed using the second area 152. Specifically, while the opponent images 1521 are arranged in a 7×7 array, a certain effect such as improvement of the attack power may be imparted in accordance with the opponent images 1521 for the users, whose games have become over due to attack of the user, being arranged vertically, horizontally, or obliquely in one line (formation of bingo). Accordingly, the entertainment characteristics of the game can be further enhanced.

Moreover, in another embodiment, the above-described game may be executed as a 49 vs 49 team battle by using the game image configuration shown in FIG. 5. For example, the user belongs to any of two teams, and 49 opponent images 1521 indicating the states of the play fields 1511 of 49 users of the ally team including the user themselves are displayed in the second area 152L in FIG. 5. The play field 1511 for which the user performs an operation, etc., are displayed in the first area 151, similar to the embodiment described above. Then, 49 opponent images 1521 for the enemy team composed of the other 49 users are displayed in the second area 152R. In this case, the opponents who can be set as "targets" may be limited to the opponents of the enemy team. Therefore, the target image 161 or the straight line 163 is displayed for any of the opponent images 1521 in the second area 152R. Accordingly, a versus game having the game nature of a team battle different from that in the embodiment described above can be realized by using the same game image configuration and display elements as in the embodiment described above.

Moreover, in another embodiment, the game systems 1 may be connected (peer-to-peer) to each other, for example, by using short-range wireless communication or the like, not via the server 101, and perform the versus game process described above.

For example, the above game process may be performed by only a single game system 1 with only one user and with the other 98 opponents being set as the AI users. In this case, exchange of data indicating the game state is completed within the game system 1. For example, the server transmission data 305 for the 98 AI users which the processor 81 is in charge of may be stored as the update data 306 in the storage section 84, instead of being transmitted to the server 101.

In the embodiment described above, the action puzzle game process of stacking puzzle objects falling from the upper side, aligning the puzzle objects in one horizontal line, and deleting the puzzle objects has been described as an example. However, the above process is not limited to such a puzzle game, and can be applied to various action puzzle game processes. For example, the above process can be applied to a puzzle game process in which the puzzle objects appear from the lower side toward the upper side.

In the embodiment described above, as an example of the game process, the puzzle game has been described. However, the game process is not limited to the puzzle game process. In another embodiment, the above process may be applied to a game process other than a puzzle game, as long as game processes related to the user and a plurality of opponents independently proceed in the game.

As for the position relationship between the first area 151 and the second area 152, the example in which the first area 151 is located at the center of the game image and the two second areas 152 are located at the right and left sides of the first area 151 is shown in the above example. The position relationship is not limited thereto, and the second areas 152 may be located above and below the first area 151, for example. Furthermore, the positions of the second areas 152 are not fixed and may be constantly moved around the first area 151, for example.

The above game process can be performed not only in the above game systems 1 but also in information processing apparatuses such as hand-held game apparatuses and smartphones. Here, in the case of performing the above process in a hand-held game apparatus having two display screens, for example, the above first area (an image regarding game play by the user) may be displayed on a first display screen, and the above second area (that is, the opponent images 1521 for 98 opponents) may be displayed on a second display screen.

Moreover, in another embodiment, the above series of processes according to the game process of each user may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. For example, the server side apparatus may perform a main game process, and the terminal side apparatus may receive and display a game image generated as a result of the game process at the server side apparatus, thereby progressing the game. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A non-transitory computer-readable storage medium having stored therein a game program executable by a computer of a processing apparatus configured to provide a versus game to a user, the game program, when executed, causing the computer to at least:

perform a first game process that proceeds independently of a second game process related to opponents for the user, on the basis of an operation by the user;

sequentially acquire state data including specified information data indicating whether each of the plurality of the opponents has specified the user as a target;

sequentially generate a display image including a first image reflecting a first game state of the first game process and a second image for making it possible to recognize that the opponent has specified the user as a target if the specified information data indicates that the opponent has specified the user as a target;

select at least one policy, on the basis of an operation by the user, from among a plurality of preset policies;

specify at least one opponent as a target from among the plurality of the opponents on the basis of the selected policy; and make an instruction that changes a game state of the opponent specified as the target, if a game state of the user satisfies a predetermined condition.

2. The storage medium according to claim 1, wherein the state data includes a second game state of the second game process related to each of a plurality of the opponents.

3. The storage medium according to claim 1, wherein a third image is generated on the basis of the acquired state data such that the third image includes ranking images that allow ranking of each of the plurality of the opponents to be recognized, and the third image is included in the display image.

4. The storage medium according to claim 3, wherein if one of the opponents comes into a state where the game cannot be continued, the third image is generated such that the third image includes the ranking image that allows the ranking of the one of the opponents fixed at a time when the one of the opponents comes into the state where the game cannot be continued, to be recognized, and the third image is included in the display image.

5. The storage medium according to claim 1, wherein:
third game images reflect game states for the opponents, even after the game state of the user becomes a state where the game cannot be continued, the state data continues to be sequentially acquired, and even after the game state of the user becomes the state where the game cannot be continued, the display image including the third images is sequentially generated on the basis of the state data.

6. The storage medium according to claim 1, wherein the display image is sequentially generated such that the first image is arranged in a first area and third game images reflecting game states for the opponents are arranged in a second area.

7. The storage medium according to claim 6, wherein the display image is sequentially generated such that the first image is arranged in a first area located at a center of the display image and each of the third images is located at a position different from that of the first area.

8. The storage medium according to claim 6, wherein the display image is sequentially generated such that the first image is arranged in a first area located at a center of the display image, a second area is located at a position at each of right and left sides of the first area, and the third images are arranged in the respective second areas at the right and left sides.

9. The storage medium according to claim 1, wherein a display image is generated, the display image including a target image superimposed on a third image indicating state data for a respective opponent generated on the basis of the state data indicating a play state of the game of the opponent specified as the target.

10. The storage medium according to claim 1, wherein:
the versus game is a puzzle game including deleting puzzle objects in a play field, the number of which increases over time,
the instruction increases the number of puzzle objects for the opponent specified as the target and is made, and
a determination is made that the game state is a game state where the game cannot be continued, if an arrangement state of the puzzle objects within the play field satisfies a defeat condition, and
a determination is made that a victory condition is satisfied, if the user, until an end of the game, does not satisfy the defeat condition and the plurality of the opponents do not satisfy the defeat condition.

11. The storage medium according to claim 10, wherein:
the game program further causes the computer to add a value to a user parameter associated with the user that indicates how many opponents the user has defeated, if the game state of the one of the opponents specified as the target by the user satisfies the defeat condition due to the puzzle objects increasing as a result of the instruction made by the information processing apparatus of the user,
the state data includes information of an opponent parameter associated with the one of the opponents that indicates how many opponents the one of the opponents has defeated, and
a third image including information indicating the opponent parameter is generated on the basis of the information.

12. The storage medium according to claim 11, wherein the value based on the opponent parameter is added to the user parameter.

13. The storage medium according to claim 11, wherein if the selected policy is a first policy, the one of the opponents having the largest opponent parameter is specified as the target.

14. The storage medium according to claim 10, wherein if the selected policy is a third policy, an opponent closest to the defeat condition is specified as a target for the user.

15. The storage medium according to claim 1, wherein if the selected policy is a second policy, an opponent who has specified the user as a target is specified as a target for the user on the basis of the specified information.

16. The storage medium according to claim 1, wherein at least one opponent is specified as the target from among the plurality of the opponents on the basis of an instruction by the user regardless of the selected policy.

17. The storage medium according to claim 16, wherein if the selected policy is a fourth policy, a randomly determined opponent is specified as a target for the user.

18. The storage medium according to claim 1, wherein game screens of other participants of the game are versus displayed.

19. A processing apparatus configured to provide a versus game to a user, comprising:
at least one processor and a memory, the at least one processor being configured to control the processing apparatus to perform operations comprising:
performing a first game process that proceeds independently of a second game process related to opponents for the user, on the basis of an operation by the user;
sequentially acquiring state data including specified information data indicating whether each of the plurality of the opponents has specified the user as a target;
sequentially generating a display image including a first image reflecting a first game state of the first game process and a second image for making it possible to recognize that the opponent has specified the user as a target if the specified information data indicates that the opponent has specified the user as a target;
selecting at least one policy, on the basis of an operation by the user, from among a plurality of preset policies;
specifying at least one opponent as a target from among the plurality of the opponents on the basis of the selected policy; and
making an instruction that changes a game state of the opponent specified as the target, if a game state of the user satisfies a predetermined condition.

20. A processing system configured to provide a versus game to a user, comprising:
at least one processor and a memory, the at least one processor being configured to perform operations including:
performing a first game process that proceeds independently of a second game process related to opponents for the user, on the basis of an operation by the user;
sequentially acquiring state data including specified information data indicating whether each of the plurality of the opponents has specified the user as a target;
sequentially generating a display image including a first image reflecting a first game state of the first game process and a second image for making it possible to recognize that the opponent has specified the user as a target if the specified information data indicates that the opponent has specified the user as a target;
selecting at least one policy, on the basis of an operation by the user, from among a plurality of preset policies;
specifying at least one opponent as a target from among the plurality of the opponents on the basis of the selected policy; and
making an instruction that changes a game state of the opponent specified as the target, if a game state of the user satisfies a predetermined condition.

21. A game process control method executed by a computer that controls a processing apparatus for providing a versus game to a user, the game process control method comprising:
- performing a first game process that proceeds independently of a second game process related to opponents for the user, on the basis of an operation by the user;
- sequentially acquiring state data including specified information data indicating whether each of the plurality of the opponents has specified the user as a target;
- sequentially generating a display image including a first image reflecting a first game state of the first game process and a second image for making it possible to recognize that the opponent has specified the user as a target if the specified information data indicates that the opponent has specified the user as a target;
- selecting at least one policy, on the basis of an operation by the user, from among a plurality of preset policies;
- specifying at least one opponent as a target from among the plurality of the opponents on the basis of the selected policy; and
- making an instruction that changes a game state of the opponent specified as the target, if a game state of the user satisfies a predetermined condition.

* * * * *